(12) United States Patent
Jain et al.

(10) Patent No.: US 12,423,889 B2
(45) Date of Patent: Sep. 23, 2025

(54) MODIFYING PATHS IN DIGITAL VECTOR IMAGES BY SNAPPING TO SIMILAR PATH GEOMETRIES

(71) Applicant: Adobe Inc., San Jose, CA (US)

(72) Inventors: Ashish Jain, Delhi (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 287 days.

(21) Appl. No.: 18/354,108

(22) Filed: Jul. 18, 2023

(65) Prior Publication Data

US 2025/0029293 A1  Jan. 23, 2025

(51) Int. Cl.
G06T 11/20 (2006.01)
G06T 3/153 (2024.01)
G06T 7/60 (2017.01)
G06T 11/60 (2006.01)

(52) U.S. Cl.
CPC ............ *G06T 11/203* (2013.01); *G06T 3/153* (2024.01); *G06T 7/60* (2013.01); *G06T 11/60* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 2005/0114771 | A1* | 5/2005 | Piehler | G06F 40/10 715/264 |
| 2006/0103673 | A1* | 5/2006 | Kerr | G06F 40/103 345/629 |
| 2017/0039739 | A1* | 2/2017 | Doran | G06T 11/203 |
| 2020/0118313 | A1* | 4/2020 | Phogat | G06F 3/04845 |
| 2021/0133477 | A1* | 5/2021 | Dhanuka | G06F 16/9014 |

* cited by examiner

*Primary Examiner* — Jason A Pringle-Parker
(74) *Attorney, Agent, or Firm* — Keller Preece PLLC

(57) ABSTRACT

Methods, systems, and non-transitory computer readable storage media are disclosed for modifying paths in digital vector images according to similar path geometries in the digital vector images. The disclosed system generates a path cache comprising path information for a plurality of connected path sets within a digital image. The disclosed system also determines, from the plurality of connected path sets, one or more candidate path sets including path information in the path cache within a threshold error of path information of a selected connected path set including an anchor point in the digital image. The disclosed system modifies, utilizing the path cache, the path information of the selected connected path set utilizing path information of a candidate path set of the one or more candidate path sets.

20 Claims, 14 Drawing Sheets

MODIFYING PATHS IN DIGITAL VECTOR IMAGES BY SNAPPING TO SIMILAR PATH GEOMETRIES

BACKGROUND

Vector-based graphics are an important component in many digital graphics environments. Specifically, vector-based graphics provide lossless scaling of images for achieving resolution independence, which is particularly useful in converting digital images to print. Although lossless scaling of vector images can be critical for many digital image uses, performing certain operations within vector image spaces can be challenging. Specifically, using paths such as Bezier splines in a vector space can make it difficult to create uniform, repeated geometries, which are a common characteristic of many digital image designs. In particular, recreating the same geometry across more than one set of path points involves determining the placements of anchor points and their controls for each individual instance of the geometry, which can be both challenging and time consuming.

SUMMARY

One or more embodiments provide benefits and/or solve one or more of the foregoing or other problems in the art with systems, methods, and non-transitory computer readable storage media for modifying paths in digital vector images according to similar path geometries in the digital vector images. For example, in one or more embodiments, the disclosed systems generate a path cache including path information for connected/sequential paths of a digital image. The disclosed systems determine candidate path sets that are similar to a selected connected path set by comparing path information of the selected connected path set and the path information of connected path sets in the path cache. In some embodiments, the disclosed systems provide a visual indicator of one or more candidate path sets within a graphical user interface displaying the digital image. In some embodiments, the disclosed systems also modify path information of the selected connected path set using the path information of a candidate path set from the path cache. The disclosed systems thus provide a tool for efficiently and accurately replicating path information across paths within a digital vector image.

BRIEF DESCRIPTION OF THE DRAWINGS

Various embodiments will be described and explained with additional specificity and detail through the use of the accompanying drawings.

DETAILED DESCRIPTION

Figure 1:
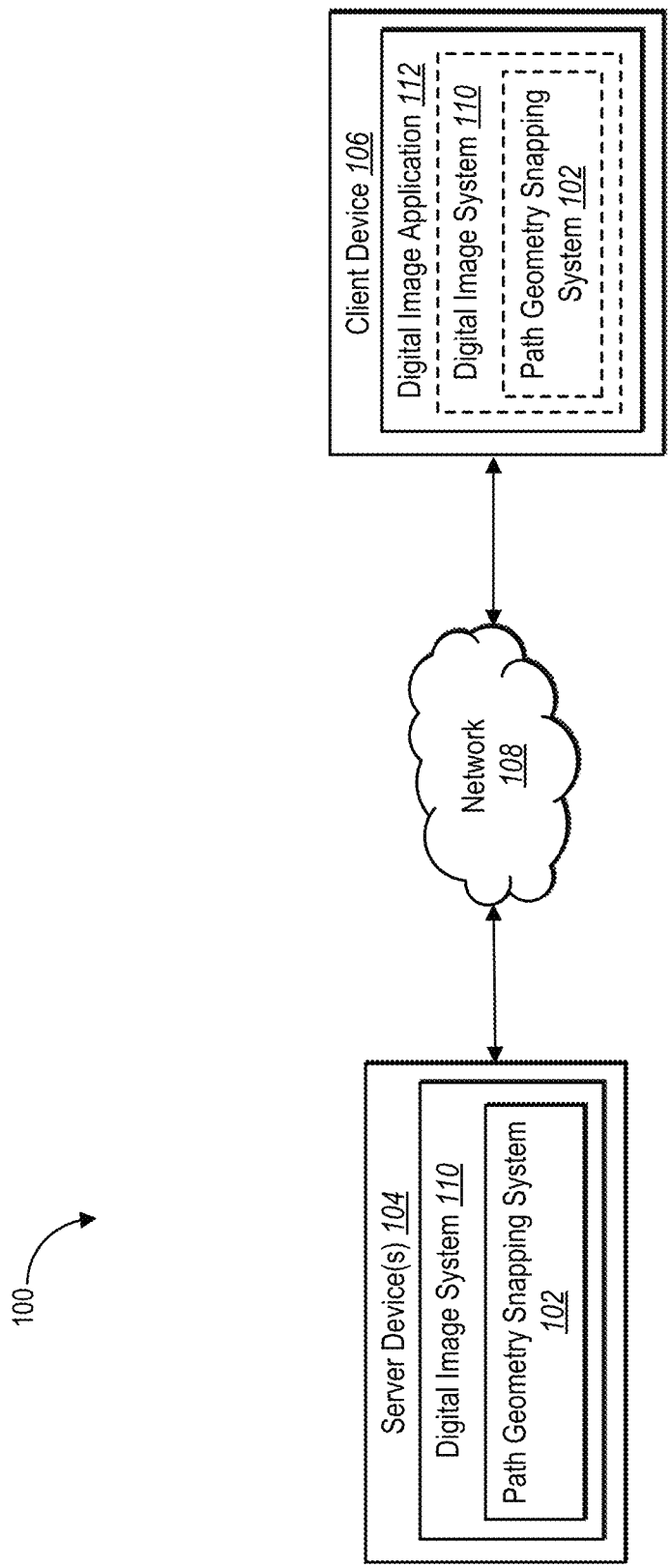
FIG. 1 illustrates an example system environment in which a path geometry snapping system operates in accordance with one or more implementations.

One or more embodiments of the present disclosure include a path geometry snapping system that modifies a path geometry in a digital vector image based on similar path geometries identified in the digital vector image. Conventional systems have a number of disadvantages with respect to modifying path geometries in digital vector images. Specifically, conventional systems typically require users to change a path in a digital vector image by manually modifying individual anchor points in the path. For example, these conventional systems provide tools for manually modifying individual placement of anchor points along a path, as well as positions of handles corresponding to the anchor points (e.g., according to control points of the anchor points).

Because the conventional systems require adjustment of individual paths via a plurality of separate inputs in digital vector images, replicating a single path geometry at different positions within a digital vector image can be difficult and time consuming. In particular, adjusting anchor points (or corresponding control points) of a path can require significant time or expertise to accurately reproduce the same path geometry across a plurality of path segments. Additionally, changing a path geometry via the conventional systems can involve updating each additional instance of the path geometry in the digital image. Thus, even small tweaks to a repeating path geometry can result in a significant amount of time and excessive user interactions to update all instances of the repeating path geometry via the conventional systems via modification of each individual anchor point and/or corresponding control points.

As mentioned, in one or more embodiments, the path geometry snapping system generates a patch cache including path information for connected/sequential paths in a digital image. Specifically, the path geometry snapping system generates a data structure that includes path information for sets of connected paths of a digital image. For example, in response to a selection of an anchor point in the digital image, the path geometry snapping system identifies connected path sets (e.g., pairs of sequential path segments) in the digital image. Additionally, the path geometry snapping system stores path information for the connected path sets in the path cache for later access.

In one or more embodiments, the path geometry snapping system determines similar path geometries to a selected path geometry using the path cache. For instance, the path geometry snapping system determines, from connected path sets in the path cache, one or more candidate path sets including path information within a threshold error of path information of a selected connected path set. To illustrate, the path geometry snapping system utilizes a comparison algorithm (e.g., a Kabsch algorithm) to compare metadata for control points of one or more anchor points in the selected connected path set to metadata for control points of corresponding anchor points in the candidate path sets.

In at least some embodiments, the path geometry snapping system provides visual indicators of similar path geometries for a selected path geometry within a graphical user interface displaying a digital image. In particular, the path geometry snapping system determines one or more candidate path sets having similar path information to the selected connected path set. The path geometry snapping system generates a visual indicator in response to determining that a particular candidate path set is within a threshold error of the selected connected path set. For example, the path geometry snapping system highlights the candidate path set by modifying a color of the candidate path set or by overlaying a temporary stroke on top of the candidate path set.

In some embodiments, the path geometry snapping system modifies a selected path geometry in response to determining that the path geometry is within a threshold error of a candidate path geometry. Specifically, the path geometry snapping system iteratively compares the path information of a selected connected path set to path information of candidate path sets (e.g., while an anchor point of the selected connected path set is selected or moving) to determine that the selected connected path set is within an additional threshold error of a particular candidate path set. The path geometry snapping system modifies the selected connected path set to snap the path geometry of the selected connected path to the path geometry of the candidate path by replacing path information for the selected connected path set with transformed path information of the candidate path set.

The path geometry snapping system provides a number of advantages over conventional systems in connection with modifying paths in digital vector images. For example, the path geometry snapping system improves efficiency and accuracy of computing devices via automatically snapping selected path geometries to similar path geometries detected in digital images. In contrast to conventional systems that merely provide tools to modify a path via separate adjustments to individual anchor points and corresponding control points via a plurality of different inputs, the path geometry snapping system provides automatic detection, hinting, and modification of path geometries via adjustment of a plurality of control points with a single interaction/input. In particular, the path geometry snapping system utilizes an efficient path cache to maintain metadata for a list of connected path sets in a digital image to detect and visually indicate connected path sets with similar path geometries to a selected connected path set. The path geometry snapping system also leverages the path cache to automatically modify a selected connected path set based on previously cached metadata for a similar connected path set.

Furthermore, by maintaining a path cache of connected path sets in a digital image for modifying a selected connected path set, the path geometry snapping system provides improved accuracy in the path modification process. In contrast to conventional systems that provide limited tools for manually modifying paths in digital images, the path geometry snapping system provides accurate replication of path geometries via the cached path information for connected path sets in digital images. Specifically, by leveraging path information of a candidate path set to modify a selected connected path set (e.g., via a transformation matrix), the path geometry snapping system ensures that the selected connected path set accurately replicates the path geometry of the candidate path set at the location of the selected connected path set.

Turning now to the figures, FIG. 1 includes an embodiment of a system environment 100 in which a path geometry snapping system 102 is implemented. In particular, the system environment 100 includes server device(s) 104 and a client device 106 in communication via a network 108. Moreover, as shown, the server device(s) 104 include a digital image system 110, which includes the path geometry snapping system 102. Additionally, the client device 106 includes an digital image application 112, which optionally includes the digital image system 110 and the path geometry snapping system 102.

As shown in FIG. 1, the client device 106 or the server device(s) 104 include or host the digital image system 110. The digital image system 110 includes, or is part of, one or more systems that implement digital image editing operations. For example, the digital image system 110 provides tools for performing various operations on digital images. To illustrate, the digital image system 110 communicates with the client device 106 via the network 108 to provide the tools for display and interaction via the digital image application 112 at the client device 106. Additionally, in some embodiments, the digital image system 110 receives requests to access digital images stored (e.g., at the server device(s) 104 or at another device such as a digital content database) and/or requests to store digital images. In some embodiments, the digital image system 110 receives interaction data for viewing, generating, or editing a digital image (e.g., a digital vector image), processes the interaction data (e.g., to view, generate, or edit a digital image), and provides the results of the interaction data for display via the digital image application 112 or to a third-party system.

In one or more embodiments, a digital image includes a digital vector image with image content represented via one or more mathematical paths (e.g., curves or lines). Additionally, a digital image can be stored in a file format such as SVG, EPS, or PDF. Furthermore, in one or more embodiments, a digital image includes pictures or text. Accordingly, the digital image system 110 provides image editing operations for digital vector images.

According to one or more embodiments, the digital image system 110 utilizes the path geometry snapping system 102 to modify digital images. In particular, in connection with editing digital images, the digital image system 110 utilizes the path geometry snapping system 102 to detect and/or modify similar path geometries within a digital image. For example, the path geometry snapping system 102 caches path information for sets of connected paths in the digital image for detecting similar path geometries. Additionally, the path geometry snapping system 102 utilizes the cached path information to provide visual hinting of similar path geometries. Furthermore, the path geometry snapping system 102 provides tools for modifying a digital image by automatically modifying a path geometry according to similar path geometries in the digital image (e.g., by snapping a selected path geometry to a similar path geometry).

As illustrated in FIG. 1, the path geometry snapping system 102 can be implemented on the client device 106 or on the server device(s) 104. In particular, in some implementations, the path geometry snapping system 102 on the server device(s) 104 supports the path geometry snapping system 102 on the client device 106. For instance, the server device(s) 104 generates or obtains the path geometry snapping system 102 for the client device 106 (e.g., as part of a software application or suite). The server device(s) 104 provides the path geometry snapping system 102 to the client device 106 for performing digital image editing processes at the client device 106. In other words, the client device 106 obtains (e.g., downloads) the path geometry snapping system 102 from the server device(s) 104. At this point, the client device 106 is able to utilize the path geometry snapping system 102 to detect similar path geometries and modify path geometries independently from the server device(s) 104.

In additional embodiments, although FIG. 1 illustrates the server device(s) 104 and the client device 106 communicating via the network 108, the various components of the system environment 100 communicate and/or interact via other methods (e.g., the server device(s) 104 and the client device 106 communicate directly). Furthermore, although FIG. 1 illustrates the path geometry snapping system 102 being implemented by a particular component and/or device within the system environment 100, the path geometry snapping system 102 is implemented, in whole or in part, by other computing devices and/or components in the system environment 100. For example, in some embodiments, the server device(s) 104 include or host the digital image system 110 and/or the path geometry snapping system 102.

To illustrate, the path geometry snapping system 102 includes a web hosting application that allows the client device 106 to interact with content and services hosted on the server device(s) 104 (e.g., in a software as a service implementation). To illustrate, in one or more implementations, the client device 106 accesses a web page supported by the server device(s) 104. The client device 106 provides input to the server device(s) 104 to perform digital image editing operations and, in response, the path geometry snapping system 102 or the digital image system 110 on the server device(s) 104 performs operations to modify digital images via automatic path modification operations. The server device(s) 104 provide the output or results of the operations to the client device 106.

In one or more embodiments, the server device(s) 104 include a variety of computing devices, including those described below with reference to FIG. 12. For example, the server device(s) 104 includes one or more servers for storing and processing data associated with editing digital images. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 12). Furthermore, although not shown in FIG. 1, the client device 106 is operable by a user (e.g., a user included in, or associated with, the system environment 100) to perform a variety of functions. In particular, the client device 106 performs functions such as, but not limited to, accessing, viewing, and interacting with digital images. In some embodiments, the client device 106 also performs functions for generating, capturing, or accessing data to provide to the digital image system 110 and the path geometry snapping system 102 in connection with editing digital content. For example, the client device 106 communicates with the server device(s) 104 via the network 108 to provide information (e.g., user interactions) associated with digital content. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 optionally include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 12.

Figure 2:
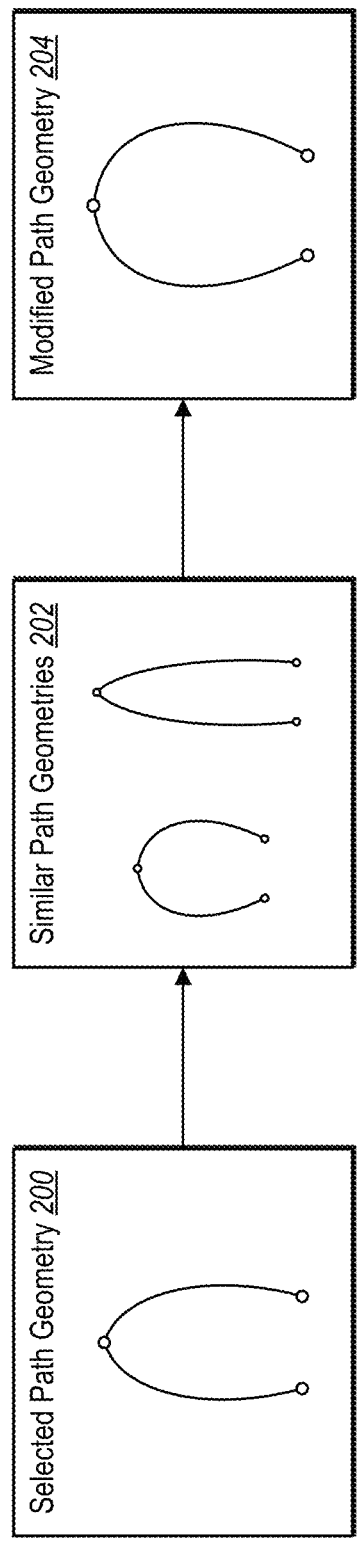
FIG. 2 illustrates a diagram of an overview of the path geometry snapping system modifying a path geometry based on similar path geometry in a digital image in accordance with one or more implementations.

As mentioned, the path geometry snapping system 102 provides automatic detection of similar path geometries in a digital image for modifying a selected path geometry. FIG. 2 illustrates an overview of the path geometry snapping system 102 modifying a selected path geometry 200 according to similar path geometries 202 in a digital image. In particular, the path geometry snapping system 102 modifies the digital image by modifying the selected path geometry 200.

In one or more embodiments, a path geometry (e.g., the selected path geometry 200) includes a set of two or more paths connected by one or more anchor points. For example, the selected path geometry 200 includes a plurality of Bezier paths connected by at least one anchor point in a digital image. Alternatively, the selected path geometry 200 includes a Bezier path and a non-Bezier path (e.g., a straight line) connected by at least one anchor point. In some embodiments, the selected path geometry 200 includes more than two paths connected by one or more anchor points. In additional embodiments, the selected path geometry 200 includes two or more paths connected by more than one anchor point (e.g., two paths connected at ends of the paths by two separate anchor points.

As illustrated in FIG. 2, the path geometry snapping system 102 determines similar path geometries 202 to the selected path geometry 200 in the digital image. In particular, the path geometry snapping system 102 determines one or more sets of paths connected by one or more anchor points that have similar geometries to the selected path geometry 200. For instance, the path geometry snapping system 102 determines the similar path geometries 202 by determining sets of connected paths that have similar shapes to the selected path geometry 200 according to various attributes of the paths and/or anchor points of the sets of connected paths. As described in more detail below with respect to FIGS. 3 and 5, the path geometry snapping system 102 determines candidate path sets that have similar geometries to a selected connected path set based on corresponding path information from a path cache.

Figure 3:
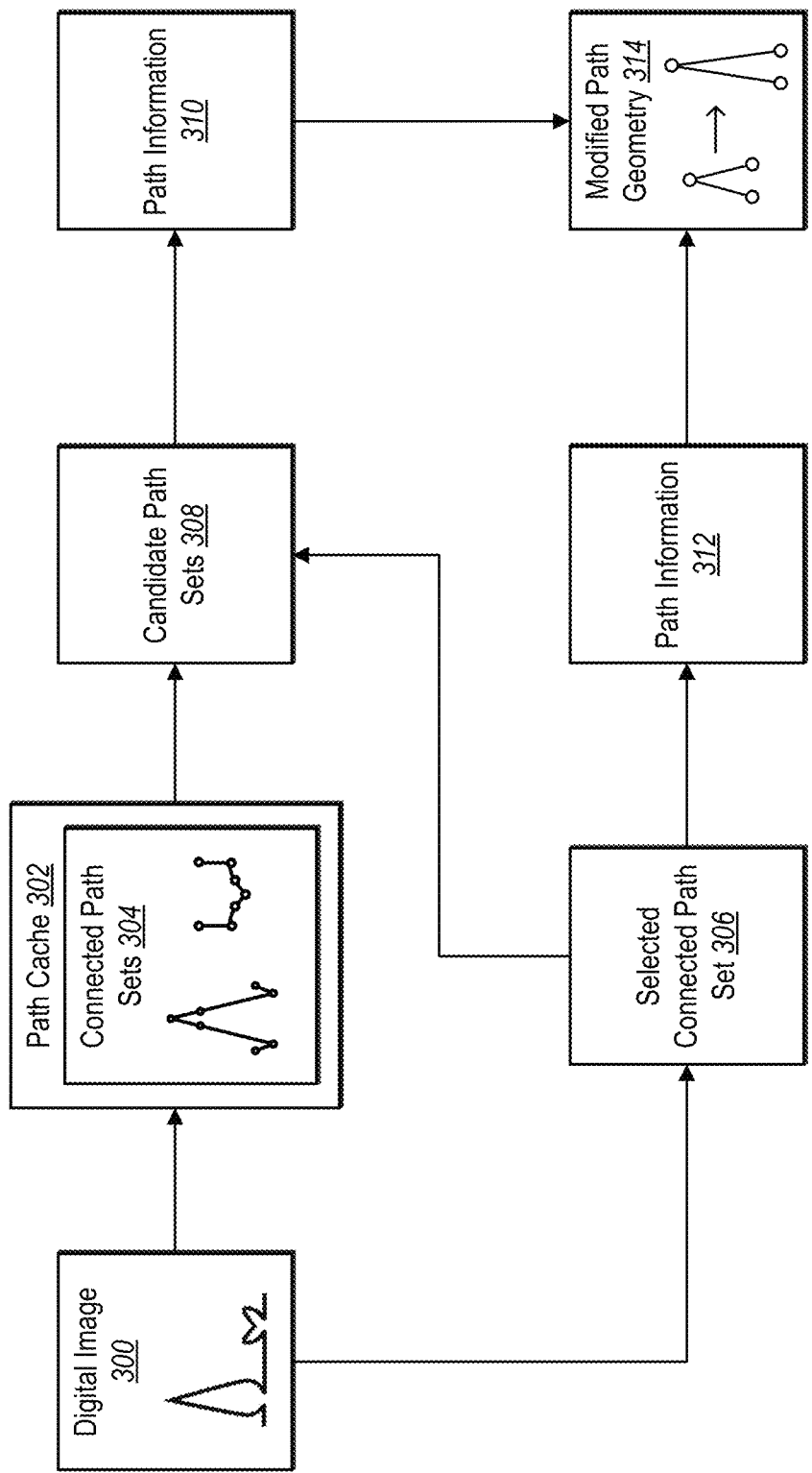
FIG. 3 illustrates a diagram of the path geometry snapping system modifying a path geometry in a digital image via path information of a selected path geometry and candidate path geometries in accordance with one or more implementations.
Figure 6:
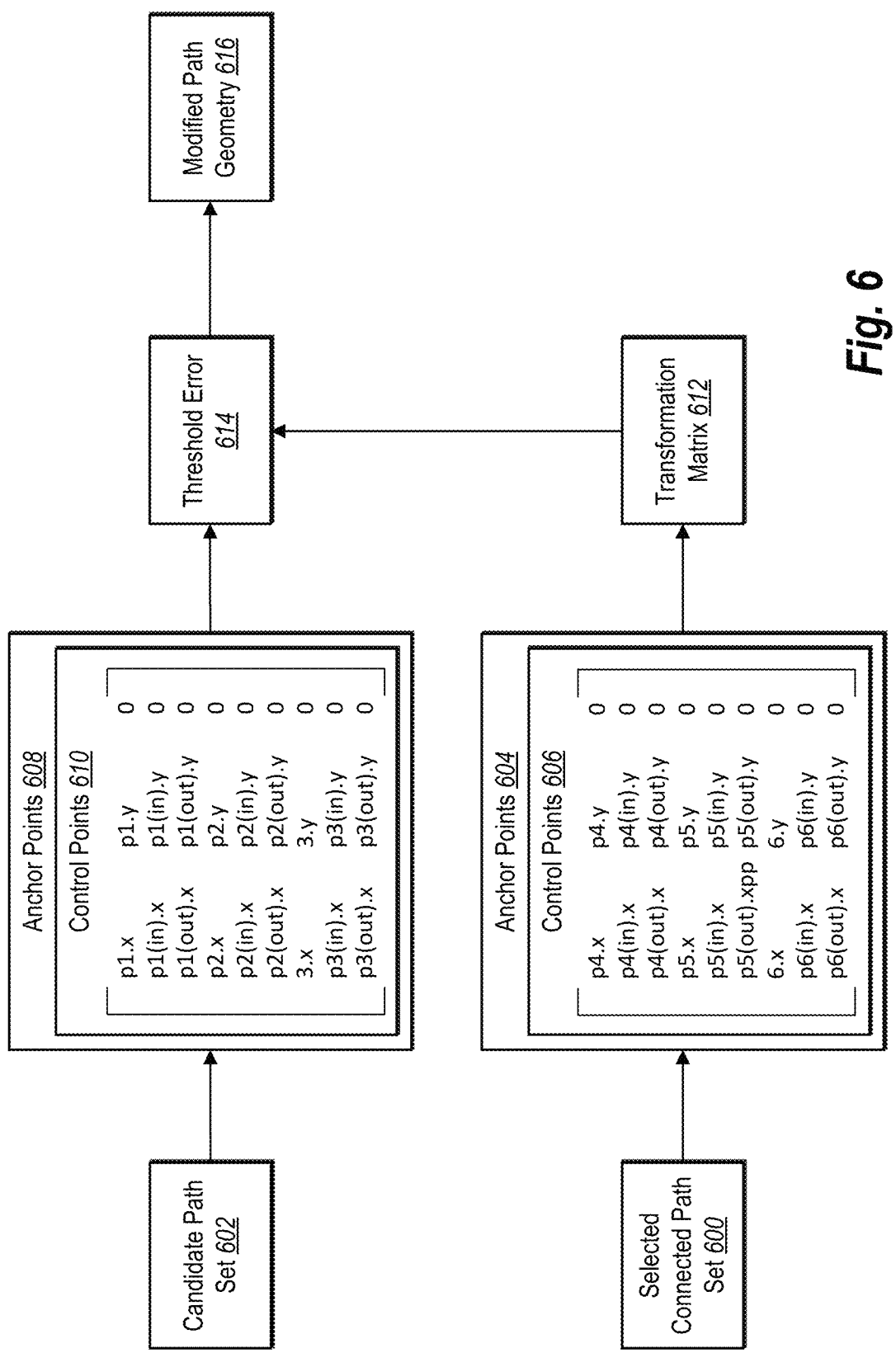
FIG. 6 illustrates a diagram of the path geometry snapping system modifying a path geometry of a selected connected path set using path information of a candidate path set in accordance with one or more implementations.
Figure 7:
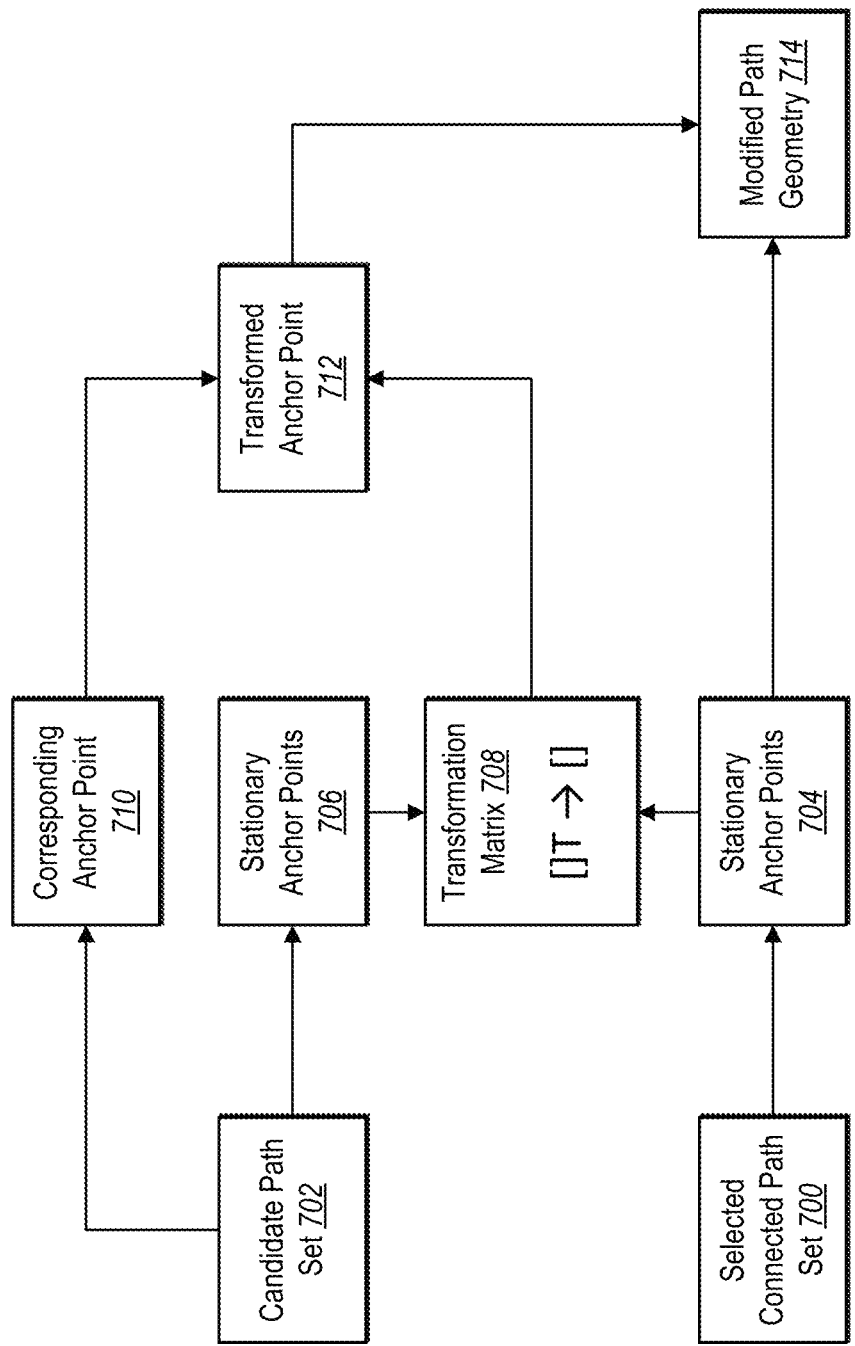
FIG. 7 illustrates a diagram of the path geometry snapping system using a transformation matrix to modify path information of a candidate path set to generate a modified path geometry in accordance with one or more implementations.

FIG. 2 illustrates that the path geometry snapping system 102 determines a modified path geometry 204 from the selected path geometry 200. For example, the path geometry snapping system 102 utilizes the similar path geometries 202 to modify the selected path geometry 200 utilizing path information of a particular similar path geometry. To illustrate, the path geometry snapping system 102 transforms at least a portion of the path information of a connected path set to snap the selected path geometry to the particular similar path geometry (e.g., by changing the shape of the selected path geometry 200 to the particular similar path geometry). FIGS. 3, 6, and 7 and the corresponding description provide additional detail with respect to modifying a path geometry based on a similar path geometry.

FIG. 3 illustrates an example of the path geometry snapping system 102 modifying a path geometry for a selected set of connected paths according to path information of similar sets of connected paths. Specifically, the path geometry snapping system 102 determines a digital image 300 including a plurality of connected path sets. For example, as previously mentioned, the digital image 300 is a digital vector image that includes vector paths. To illustrate, the digital image 300 includes cubic Bezier paths represented by anchor points and additional metadata corresponding to the anchor points. More specifically, an anchor point for a Bezier path includes a plurality of control points indicating a position of the anchor point and positions of one or more handles that determine one or more curvature attributes of the Bezier path. In additional embodiments, the digital image includes another type of path such as, but not limited to, Hermite curves, B-splines, non-uniform rational basis splines, Kappa-curves, or Catmull-Rom splines.

In one or more embodiments, the path geometry snapping system 102 generates a path cache 302 to store metadata corresponding to connected path sets 304 in the digital image 300. In particular, the path geometry snapping system 102 extracts metadata for a plurality of paths and anchor points from the digital image 300 to determine sequential/connected paths. For instance, the path geometry snapping system 102 determines each set of two sequential connected paths within the digital image 300. Additionally, in some embodiments, the path geometry snapping system 102 determines each set of n connected paths (e.g., 3 sequential connected paths) in response to detecting a selection of a plurality of anchor points in the digital image (e.g., two anchor points connecting a sequence of three separate paths). The path geometry snapping system 102 determines metadata for each of the sequential connected paths (e.g., according to control points of anchor points in the sequential connected paths) and inserts the metadata into the path cache 302.

Furthermore, in some embodiments, the path geometry snapping system 102 determines a path geometry for a number of connected paths including a plurality of separate connected paths based on non-sequentially selected anchor points. To illustrate, the path geometry snapping system 102 determines a first pair of connected paths and a second pair of connected paths corresponding to non-sequential anchor points as a single selection. The path geometry snapping system 102 iterates through a path cache to identify similar path geometries of separate pairs of connected paths according to the single selection.

Additionally, the path geometry snapping system 102 determines a selected connected path set 306 in the digital image 300. For example, the path geometry snapping system 102 detects a selection of one or more anchor points connecting at least two paths in the digital image (e.g., into a single path with more than one path segment or a plurality of paths connected via a single anchor point). In various embodiments, detecting the selected connected path set 306 includes detecting a mouse click action or a cursor hover action according to a user input in connection with the one or more anchor points. In additional embodiments, detecting the selected connected path set 306 includes a client device selecting the one or more anchor points in connection with one or more image editing operations or groups of image editing operations. Furthermore, in some embodiments, the path geometry snapping system 102 detects the selected connected path set 306 by detecting a selection of paths in the digital image 300 rather than a selection of one or more anchor points.

In one or more embodiments, the path geometry snapping system 102 determines candidate path sets 308 including similar path geometries to a path geometry of the selected connected path set 306. In particular, the path geometry snapping system 102 determines the candidate path sets 308 from the connected path sets 304 in the path cache 302. For example, the path geometry snapping system 102 determines that the candidate path sets 308 have similar path geometries based on the metadata stored in the path cache 302 for each of the connected path sets 304 and metadata for the selected connected path set 306.

According to additional embodiments, the path geometry snapping system 102 determines that a particular path geometry is similar of the selected path geometry for modifying the selected path geometry. For instance, the path geometry snapping system 102 compares path information 310 of the candidate path sets 308 to path information 312 of the selected connected path set 306 to determine that a candidate path set is within the threshold error of the selected connected path set 306. The path geometry snapping system 102 utilizes the path information 310 of the candidate path sets 308 to modify the path information 312 of the selected connected path set 306 and generate a modified path geometry 314. Accordingly, in some embodiments, the path geometry snapping system 102 generates the modified path geometry 314 by changing the path geometry (e.g., a shape) of the selected connected path set 306 to match the path geometry of the particular candidate path set at a location of the selected connected path set 306.

Figure 4:
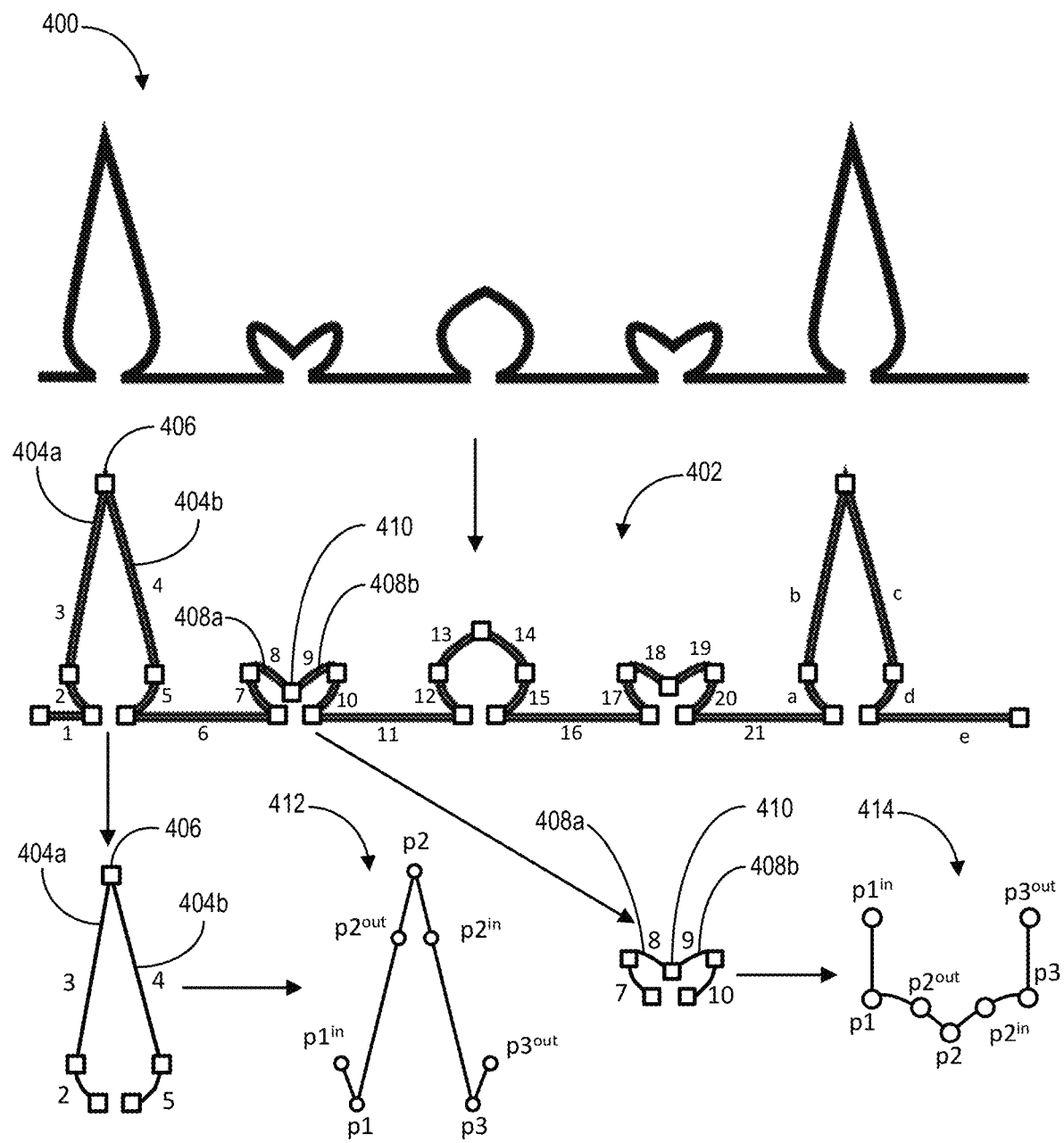
FIG. 4 illustrates a diagram of the path geometry snapping system determining path information for connected path sets in a digital image in accordance with one or more implementations.

In one or more embodiments, as mentioned, the path geometry snapping system 102 generates a path cache including sets of connected paths in a digital image. FIG. 4 illustrates a plurality of paths and sets of connected paths from a digital image. Specifically, FIG. 4 illustrates examples of connected path sets and corresponding metadata that the path geometry snapping system 102 extracts from a digital image for generating a path cache.

As illustrated in FIG. 4, the path geometry snapping system 102 determines an artwork 400 including a plurality of paths. In one or more embodiments, the artwork 400 includes a plurality of connected paths that make up a longer path. In other words, a path in a digital image can include a plurality of path segments with each path segment including a separate path defined by a set of anchor points and corresponding metadata. FIG. 4 also illustrates a labeled artwork 402 including labels for the paths and/or anchor points connecting the paths. As illustrated in FIG. 4, the labeled artwork 402 includes simplified labels (e.g., integers or letters) corresponding to the paths, though in some embodiments, the path geometry snapping system 102 utilizes path identifiers and/or anchor identifiers in connection with generating or importing the artwork 400.

In one or more embodiments, the path geometry snapping system 102 determines connected path sets from the artwork 400 by determining each set of paths connected by one or more anchor points. Specifically, as indicated in the labeled artwork 402, the artwork 400 includes a plurality of paths labeled from 1-21 and a-e. For example, as illustrated, the path geometry snapping system determines that the artwork 400 includes a first set of sequential paths including a first path 404a and a second path 404b connected by a first anchor point 406. Additionally, the path geometry snapping system 102 determines that the artwork 400 includes a second set of sequential paths including a third path 408a and a fourth path 408b connected by a second anchor point 410.

Although FIG. 4 illustrates that sets of sequential paths correspond to paths in different portions of the artwork 400, in additional embodiments, the path geometry snapping system 102 also determines additional sets of sequential paths in the artwork 400. For example, the path geometry snapping system 102 also determines a set of sequential paths including the second path 404b and an adjacent path (e.g., labeled "5" in the labeled artwork 402) connected by an anchor point. Furthermore, although FIG. 4 illustrates that the artwork 400 includes a plurality of paths connected as part of a single path object, the path geometry snapping system 102 also determines sequential paths in separate path objects. To illustrate, for a digital image including the artwork 400 and an additional path object, the path geometry snapping system 102 also determines sets of sequential paths in the additional path object.

In one or more embodiments, the path geometry snapping system 102 stores metadata for a plurality of connected path sets in a path cache. For instance, as illustrated in FIG. 4, the path geometry snapping system 102 stores a first connected path set 412 including metadata corresponding to the first set of sequential paths (e.g., the first path 404a and the second path 404b connected by the first anchor point 406). Additionally, the path geometry snapping system 102 stores a second connected path set 414 including the second set of sequential paths (e.g., the third path 408a and the fourth path 408b connected by the second anchor point 410). In some embodiments, the path geometry snapping system 102 stores the connected path sets in the path cache as separate entries in a table. In additional embodiments, the path geometry snapping system 102 stores the connected path sets in the path cache according to another type of data structure, such as vectors in a matrix.

Additionally, in one or more embodiments, the path geometry snapping system 102 generates each connected path cache by determining a plurality of control points for anchor points corresponding to each set of sequential paths. Specifically, each anchor point in a set of sequential paths includes one or more control points representing a position of the anchor point or positions of handles corresponding to the anchor points. For example, the path geometry snapping system 102 determines coordinates of control points corresponding to a connecting anchor point in a set of sequential paths.

To illustrate, the path geometry snapping system 102 determines a plurality of control points for the anchor points of the first connected path set 412. FIG. 4 illustrates that the path geometry snapping system 102 determines three control points corresponding to the first anchor point 406-a first control point ("p2") representing a position of the first anchor point 406, a second control point ("p2$^{out}$") for a first handle corresponding to the first path 404a, and a third control point ("p2$^{in}$") for a second handle corresponding to the second path 404b. The path geometry snapping system 102 also determines control points ("p1," "p3") for end points of the paths representing the positions of anchor points at the end points and inner control points ("p1$^{in}$," "p3$^{out}$") corresponding to handles corresponding to the first path 404a and the second path 404b at the end points. Accordingly, the path geometry snapping system 102 stores the first connected path set 412 as: {p1, p1$^{in}$, p2, p2$^{in}$, p2$^{out}$, p3, p3$^{out}$}. Additionally, the path geometry snapping system 102 determines each additional connected path set (e.g., the second connected path set 414) by determining metadata for anchor points of corresponding paths (e.g., the third path 408a and the fourth path 408b).

Figure 5:
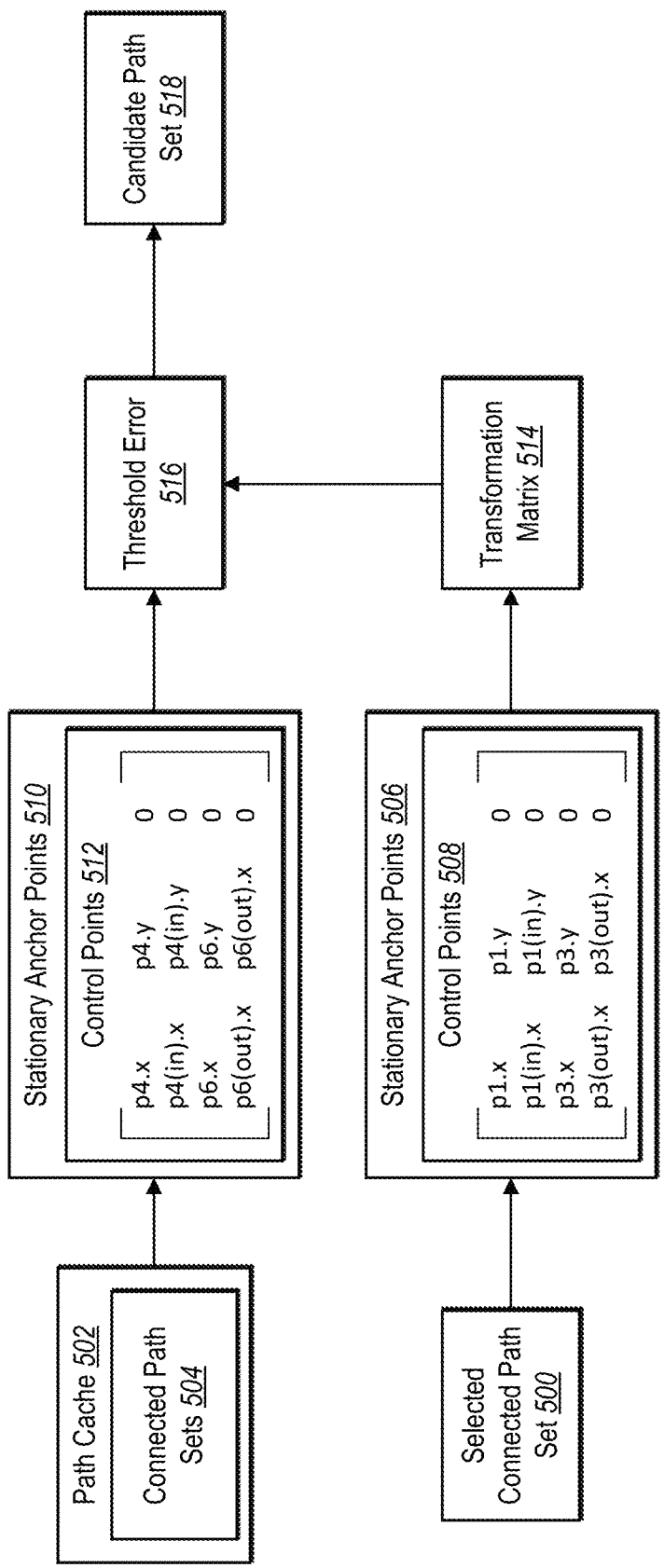
FIG. 5 illustrates a diagram of the path geometry snapping system determining a candidate path set for a selected connected path set in accordance with one or more implementations.

As mentioned, the path geometry snapping system 102 determines similar path geometries to a path geometry of a selected set of connected paths based on path information in a path cache for a digital image. FIG. 5 illustrates that the path geometry snapping system 102 compares path information for a selected path geometry to path information for additional path geometries in a path cache to determine similar path geometries. In particular, FIG. 5 illustrates that the path geometry snapping system 102 compares path information for connected path sets of a digital image to path information for a selected connected path set to determine one or more sets of candidate paths.

In one or more embodiments, in response to determining a selected connected path set 500 in a digital image, the path geometry snapping system 102 generates a path cache 502 including connected path sets 504 from the digital image. Specifically, as described above, the path geometry snapping system 102 stores metadata for control points for anchor points corresponding to each set of sequential paths. Accordingly, the path cache 502 includes path information for each of a plurality of connected path sets in the digital image including the selected connected path set 500.

In at least some embodiments, in response to determining the selected connected path set 500 or in response to movement of an anchor point in the selected connected path set 500, the path geometry snapping system 102 determines a subset of the path information for the selected connected path set 500. For example, the path geometry snapping system 102 determines path information (e.g., metadata attributes) for stationary anchor points 506 of the selected connected path set 500. In particular, the path geometry snapping system 102 determines that one or more anchor points of the selected connected path set 500 are stationary. Additionally, the path geometry snapping system 102 determines control points 508 of the stationary anchor points 506, such as by accessing the metadata for the stationary anchor points 506 from the path cache 502.

To illustrate, the path geometry snapping system 102 determines that one or more anchor points of the selected connected path set 500 excluding a selected anchor point are stationary, while the selected anchor point is moving. In some embodiments, the path geometry snapping system 102 determines that the stationary anchor points 506 include one or more anchor points include anchor points at end points of the selected connected path set 500 (e.g., not connecting the paths of the selected connected path set 500). Alternatively, the path geometry snapping system 102 determines that a stationary anchor point connects opposite ends of the selected connected path set 500 (e.g., in a circle with two paths forming the circle and connected by two anchor points at opposite ends of the circle).

In one or more embodiments, the path geometry snapping system 102 also determines a corresponding subset of path information for the connected path sets 504 in the path cache 502. For example, the path geometry snapping system 102 determines path information for a connected path set from the connected path sets 504 of the path cache 502. In particular, the path geometry snapping system 102 determines stationary anchor points 510 for the connected path set at corresponding positions (e.g., end points) of paths relative to the stationary anchor points 506 of the selected connected path set 500. Additionally, the path geometry snapping system 102 determines control points 512 of the stationary anchor points 510 of the connected path set from the path cache 502.

The path geometry snapping system 102 compares the control points 508 of the stationary anchor points 506 of the selected connected path set 500 to the control points 512 of the stationary anchor points 510 of the connected path set. For example, the path geometry snapping system 102 utilizes a matrix comparison algorithm (e.g., a Kabsch algorithm or an algorithm that determines distances in a coordinate space for a pair of matrices and/or differences in scaling/rotation of a set of points) to determine a difference between the selected connected path set 500 and the connected path set. In one or more embodiments, the path geometry snapping system 102 applies a transformation matrix 514 to a matrix including the control points 508 of the stationary anchor points 506 of the selected connected path set 500 to determine the difference between the selected connected path set 500 and the connected path set. More specifically, the transformation matrix 514 modifies the path information of the selected connected path set 500 to be in the same coordinate region as the path information of the connected path set. Alternatively, the path geometry snapping system 102 applies the transformation matrix 514 to a matrix including the control points 512 of the stationary anchor points 510 of the connected path set for the comparison.

According to one or more embodiments, the path geometry snapping system 102 determines whether the connected path set is within a threshold error 516 of the selected connected path set 500. For instance, the path geometry snapping system 102 determines the threshold error 516 to be at a particular set of error units (e.g., 1 error unit or 0.1 error units) to indicate whether two connected path sets are within a particular similarity range (e.g., the attributes of the corresponding stationary anchor points are within the threshold error). The path geometry snapping system 102 determines the threshold error 516 according to the matrix comparison algorithm and/or according to an error tolerance. Increasing the threshold error expands the acceptable difference between two sets of connected paths to determine similar path geometries.

In response to determining that the connected path set is within the threshold error 516 of the selected connected path set 500, the path geometry snapping system 102 adds the connected path set as a candidate path set 518. For example, the path geometry snapping system 102 appends an identifier of the connected path set to a list of candidate path sets (e.g., by appending the connected path set to the list of candidate path sets). The path geometry snapping system 102 proceeds with comparing the path information for next connected path set in the path cache 502 to the path information of the selected connected path set 500. In one or more embodiments, in response to determining that a particular connected path set is not within the threshold error 516 (e.g., greater than the threshold error 516), the path geometry snapping system 102 does not add the particular connected path set as a candidate path set and moves to the next connected path set in the path cache 502. In some embodiments, the path geometry snapping system 102 continues iterating through the path cache 502 while the selected connected path set 500 is selected to identify new candidate path sets or to remove any candidate path sets that are no longer within the threshold error 516.

In one or more embodiments, the path geometry snapping system 102 utilizes a list of candidate path sets to modify a path geometry of a selected connected path set. FIG. 6 illustrates an example of the path geometry snapping system 102 modifying a path geometry of a selected connected path set according to path information of a candidate path set. Specifically, the path geometry snapping system 102 detects whether the candidate path set is within a particular amount of error of the selected connected path set, and if so, modifies the path information of the selected connected path set accordingly.

For example, as illustrated in FIG. 6, the path geometry snapping system 102 determines an operation to modify a selected connected path set 600 in a digital image. As described above, a candidate path sets correspond to connected path sets within a digital image that are within a threshold error of a selected connected path set. Accordingly, the path geometry snapping system 102 determines whether any of the candidate path sets are within an additional threshold error of the selected connected path set for determining whether to modify the selected connected path set.

To illustrate, the path geometry snapping system 102 detects movement of an anchor point of the selected connected path set 600. In connection with movement of the anchor point, the path geometry snapping system 102 monitors a path cache for the digital image to determine whether the selected connected path set 600 is within a threshold amount of error (e.g., an additional threshold error) of any candidate path sets (e.g., a candidate path set 602). In some embodiments, the path geometry snapping system 102 iterates through a list of candidate path sets while the selected connected path set 600 is selected (e.g., in an editing mode of the selected connected path set 600 within a digital image application).

As illustrated in FIG. 6, the path geometry snapping system 102 determines anchor points 604 of the selected connected path set 600 including stationary and moving anchor points. Additionally, the path geometry snapping system 102 determines metadata of the anchor points 604 including control points 606 associated with the anchor points 604. Specifically, the path geometry snapping system 102 extracts stored path information for the selected connected path set 600 in the path cache including the control points 606. Furthermore, the path geometry snapping system 102 determines anchor points 608 of the candidate path set 602 and control points 610 of the anchor points 608 from the path cache. In one or more embodiments, the path geometry snapping system 102 utilizes the metadata for all anchor points stored in the path cache for the selected connected path set 600 and the candidate path set 602 to detect when the path geometry of the candidate path set 602 meets a threshold similarity.

In one or more embodiments, the path geometry snapping system 102 compares the path information of the selected connected path set 600 to the path information of the candidate path set 602 via a matrix comparison algorithm (e.g., as described previously). For example, the path geometry snapping system 102 utilizes a transformation matrix 612 to transform a matrix including the control points 606 associated with the selected connected path set 600. Alternatively, the path geometry snapping system 102 utilizes the transformation matrix 612 to transform the matrix including the control points 610 of the candidate path set 602. The path geometry snapping system 102 utilizes the matrix comparison algorithm to compare the transformed matrix associated with the selected connected path set 600 to the matrix associated with the candidate path set 602 to determine whether the selected connected path set 600 meets (e.g., is lower than) a threshold error 614.

In response to determining that the selected connected path set is within the threshold error 614 of the candidate path set 602, the path geometry snapping system 102 modifies the selected connected path set 600. In particular, path geometry snapping system 102 determines that movement of a selected anchor point of the selected connected path set 600 reduces an error between the selected connected path set 600 and the candidate path set 602 to meet the threshold error 614. To illustrate, the path geometry snapping system 102 utilizes a first threshold error to determine a particular connected path set as the candidate path set 602. The path geometry snapping system 102 utilizes a second threshold error to determine that the candidate path set 602 is sufficiently similar to the selected connected path set 600 to generate a modified path geometry 616 for the selected connected path set 600.

According to one or more embodiments, the path geometry snapping system 102 determines a range of error values between the first threshold error and the second threshold error. For example, the path geometry snapping system 102 determines the range of error values from an error value of 1.0 as the first threshold error to an error value of 0.5 as the second threshold error. To illustrate, the path geometry snapping system 102 detects a series of error values relative to a specific candidate path set according to movement of an anchor path as: {1.0, 0.9, 0.76, 0.55, 0.45}. In one or more embodiments, the first threshold error and the second threshold error are different (e.g., as indicated above). In alternative embodiments, the first threshold error and the second threshold error are the same, such that the path geometry snapping system 102 determines candidate path sets and modifies a path geometry at the same threshold error. Accordingly, movement of the anchor point of the selected connected path set 600 causes the path geometry snapping system 102 to iteratively compare the selected connected path set 600 to one or more candidate path sets to detect when an error value associated with one or more candidate path sets meets the threshold error 614.

In one or more embodiments, the path geometry snapping system 102 determines more than one candidate path set with an error value relative to the selected connected path set 600 that meets the threshold error 614. Specifically, the path geometry snapping system 102 determines a first candidate path set and a second candidate path set below the threshold error 614. The path geometry snapping system 102 selects one of the candidate path sets to generate the modified path geometry 616 based on one or more criteria. To illustrate, the path geometry snapping system 102 selects the first candidate path set for generating the modified path geometry 616 in response to determining that the error value of the first candidate path set is lower than the error value of the second candidate path set. In an additional example, the path geometry snapping system 102 utilizes a direction of movement of a selected anchor point to select a particular candidate path set when more than one candidate path set meets the threshold value. In another embodiments, the path geometry snapping system 102 utilizes a position of a candidate path set in a pattern relative to a position of the selected connected path set in the pattern or in a different pattern to select the candidate path set.

In one or more embodiments, the path geometry snapping system 102 modifies a path geometry of a selected connected path set utilizing path information of a candidate path set. FIG. 7 illustrates an example of the path geometry snapping system 102 modifying a path geometry of a selected connected path set of a digital image according to a path geometry of another connected path set in the digital image. More specifically, the path geometry snapping system 102 modifies a subset of path information of the selected connected path set based on a subset of path information of a candidate path set.

As illustrated in FIG. 7, the path geometry snapping system 102 determines that a selected connected path set 700 is within a threshold error of a candidate path set 702 according to corresponding path information. In response to determining that the difference of the path sets meets the threshold error, the path geometry snapping system 102 utilizes metadata for a first subset of path information to modify an additional subset of path information associated with the selected connected path set 700. In particular, the path geometry snapping system 102 utilizes path information associated with a first set of anchor points of the candidate path set 700 to modify a selected (e.g., moving) anchor point of the selected connected path set 700.

For example, as illustrated, the path geometry snapping system 102 determines stationary anchor points 704 of the selected connected path set 700 and stationary anchor points 706 of the candidate path set 702. To illustrate, the path geometry snapping system 102 a transformation matrix 708 corresponding to the stationary anchor points 704 and the stationary anchor points 706. Specifically, the transformation matrix 708 includes values that cause the stationary anchor points 706 of the candidate path set 702 to have the same metadata (e.g., control points) as the stationary anchor points 704 of the selected connected path set 700. Accordingly, the transformation matrix 708 (e.g., a zero error transformation matrix) determines values for converting coordinates of the candidate path set 702 to coordinates of the selected connected path set 700.

In response to determining the transformation matrix 708 between the stationary anchor points 706 of the candidate path set 702 and the stationary anchor points 704 of the selected connected path, the path geometry snapping system 102 utilizes the transformation matrix 708 to modify a selected anchor point of the selected connected path set 700. In particular, the path geometry snapping system 102 determines a corresponding anchor point 710 of the candidate path set 702 that corresponds to a selected anchor point of the selected connected path set 700. For instance, the corresponding anchor point 710 corresponds to a particular anchor point that determines a difference between path geometry of the candidate path set 702 and the selected connected path set 700.

Accordingly, the path geometry snapping system 102 generates a transformed anchor point 712 utilizing the transformation matrix 708 for the corresponding anchor point 710. For example, the path geometry snapping system 102 modifies the corresponding anchor point 710 by applying the transformation matrix 708 to a matrix including control points of the corresponding anchor point 710 (e.g., to change a position of the corresponding anchor point 710 and handles of the corresponding anchor point 710). The path geometry snapping system 102 thus generates the transformed anchor point 712 by determining a position and metadata of the corresponding anchor point 710 in a coordinate position associated with the selected connected path set 700. The path geometry snapping system 102 modifies the selected connected path set 700 by replacing the metadata of the selected anchor point with the metadata of the transformed anchor point 712 to cause the path geometry of the selected connected path set 700 to snap to the path geometry of the candidate path set 702. More specifically, the path geometry snapping system 102 utilizes the transformation matrix 708 to update the metadata of the selected connected path set 700 to result in a zero error value between the candidate path set 702 and the selected connected path set 700 (e.g., as determined via a matrix comparison algorithm that utilizes a transformation matrix to compare the path sets). Thus, the path geometry snapping system 102 utilizes the transformed anchor point 712 to replace metadata associated with the selected connected path set 700 and generate the modified path geometry 714 for the selected connected path set 700.

As an example, the path geometry snapping system 102 determines a list of stationary anchor points from path set X (a selected connected path set) and path set Z (a candidate path set). The path geometry snapping system 102 determines a transformation matrix T representing a zero error transformation for the stationary anchor points stored in a path cache. In response to determining the transformation matrix T, the path geometry snapping system 102 determines control points (p2, $p2^{out}$, $p2^{in}$) for a corresponding anchor point in path set Z and applies the transformation matrix to the control points (p2*T, $p2^{out}$*T, $p2^{in}$*T). Additionally, the path geometry snapping system 102 replaces the corresponding control points (p5, $p5^{out}$, $p5^{in}$) for the selected anchor point in path set X with modified control points as (p5'=p2*T, $p5'^{out}$=$p2^{out}$*T, $p5'^{in}$=$p2^{in}$*T). Accordingly, the path geometry snapping system 102 replaces the selected anchor point with the new anchor point to snap the path geometry of path set X according to the path information of path set Z.

In one or more embodiments, as mentioned, the path geometry snapping system 102 provides visual indicators of similar path geometries in a digital image. FIGS. 8A-8B and 9A-9B provide graphical user interfaces of client devices for providing visual indicators of connected path sets with similar path geometries to selected connected path sets in digital images. Additionally, FIGS. 8A-8B and 9A-9B provide tools for modifying path geometries of connected path sets based on path geometries of one or more additional connected path sets in the digital images.

Figure 8A:
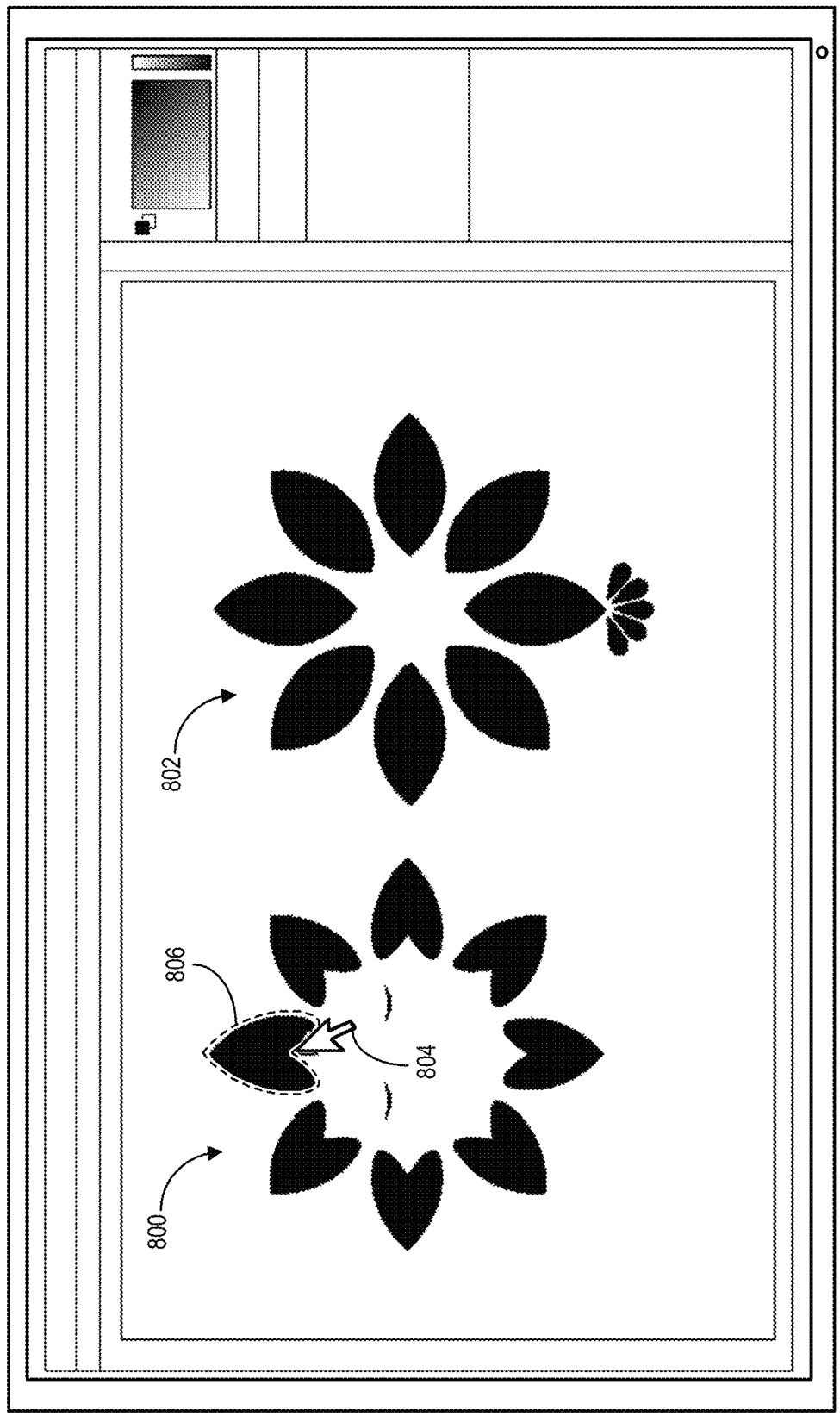
FIGS. 8A-8B illustrate graphical user interfaces for modifying a selected path geometry according to one or more similar path geometries in a digital image in accordance with one or more implementations.

FIG. 8A illustrates that a client device displays a digital image including a first artwork 800 and a second artwork 802. As illustrated, each artwork includes a plurality of path objects, with one or more of the path objects including a plurality of paths connected by a plurality of anchor points. In one or more embodiments, the path geometry snapping system 102 determines a position of a cursor 804 selecting a first path object 806 within the first artwork 800. For example, the cursor 804 selects a set of connected paths in the first path object 806 via a selection of the set of connected paths or a selection of an anchor point connecting at least two paths in the set of connected paths of the first path object 806. Additionally, in one or more embodiments, the path geometry snapping system 102 generates a path cache including all sets of connected paths in the first artwork 800 and the second artwork 802.

Figure 8B:
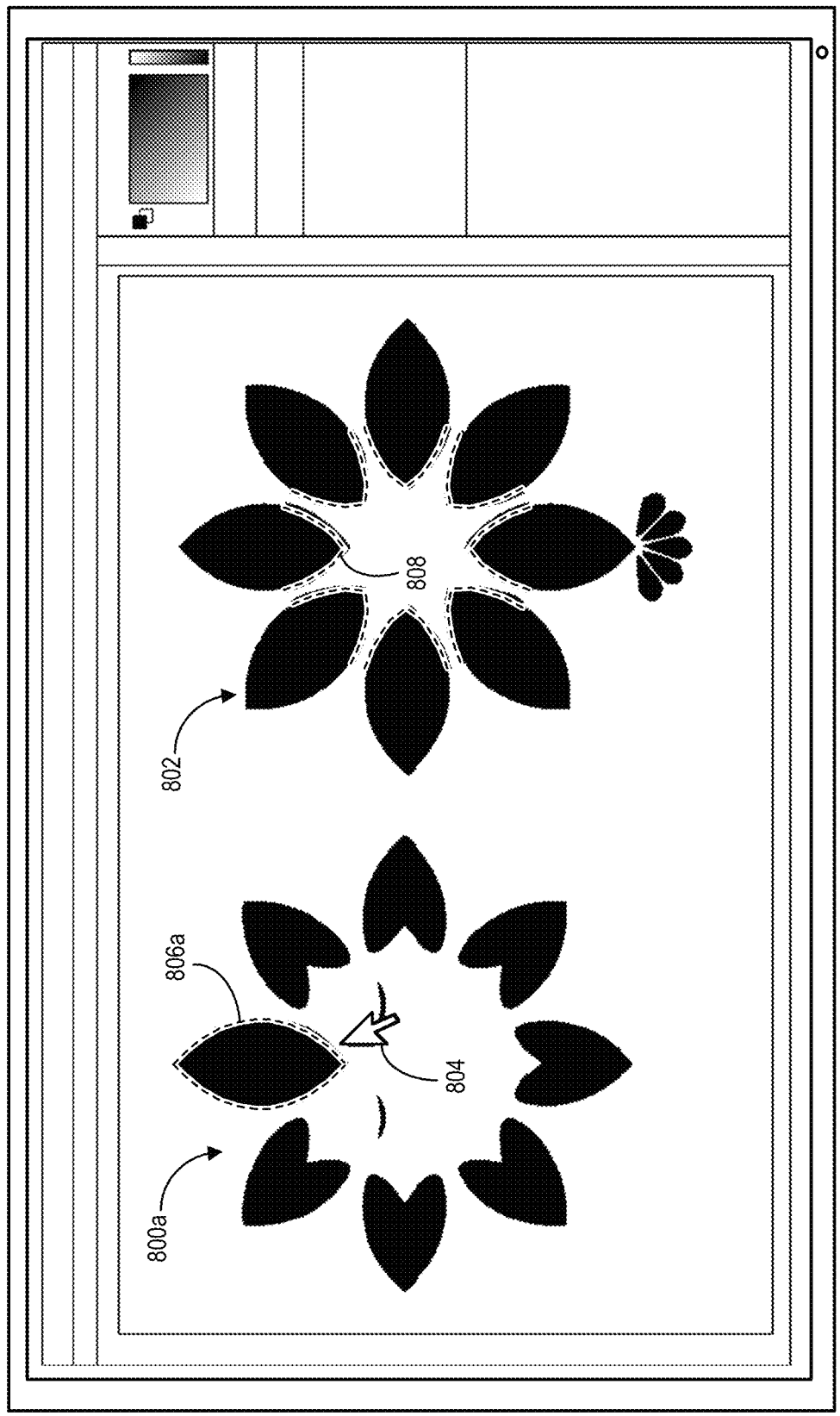

FIG. 8B illustrates that the client device displays the digital image including a modified first artwork 800a and the second artwork 802. In particular, the path geometry snapping system 102 modifies the first artwork 800 of FIG. 8A to generate the modified first artwork 800a according to one or more path objects in the second artwork 802. For instance, the path geometry snapping system 102 generates a modified path object in the modified first artwork 800a by generating a modified path object 806a according to one or more sets of connected paths in the second artwork 802. To illustrate, the path geometry snapping system 102 determines a plurality of candidate path sets (e.g., a candidate path set 808) based on the metadata associated with the sets of connected paths in the second artwork 802 from the path cache.

As illustrated in FIG. 8B, in response to the path geometry snapping system 102 determining the candidate path sets (or in response to snapping the path geometry of the selected set of connected paths to a path geometry of a candidate path set), the client device displays visual indicators of the candidate path sets. Specifically, the client device displays the visual indicators of the candidate path sets by highlighting the candidate path sets in response to snapping the path geometry of the modified path object 806a to the path geometry of the candidate path sets (e.g., the path geometry of the candidate path set 808). For example, the client device changes a color of each candidate path set in the graphical user interface to highlight the candidate path set. Alternatively, the client device overlays an element on top of the candidate path set (e.g., an additional stroke or strokes following the paths in the candidate path set) or provides a notification of similar path geometries in a separate portion of the graphical user interface. In some embodiments, the client device also provides a visual indicator of the path geometry of the selected set of connected paths. Thus, the client device provides visual hints indicating each of the candidate path sets with similar path geometries to the selected set of connected paths.

Figure 9A:
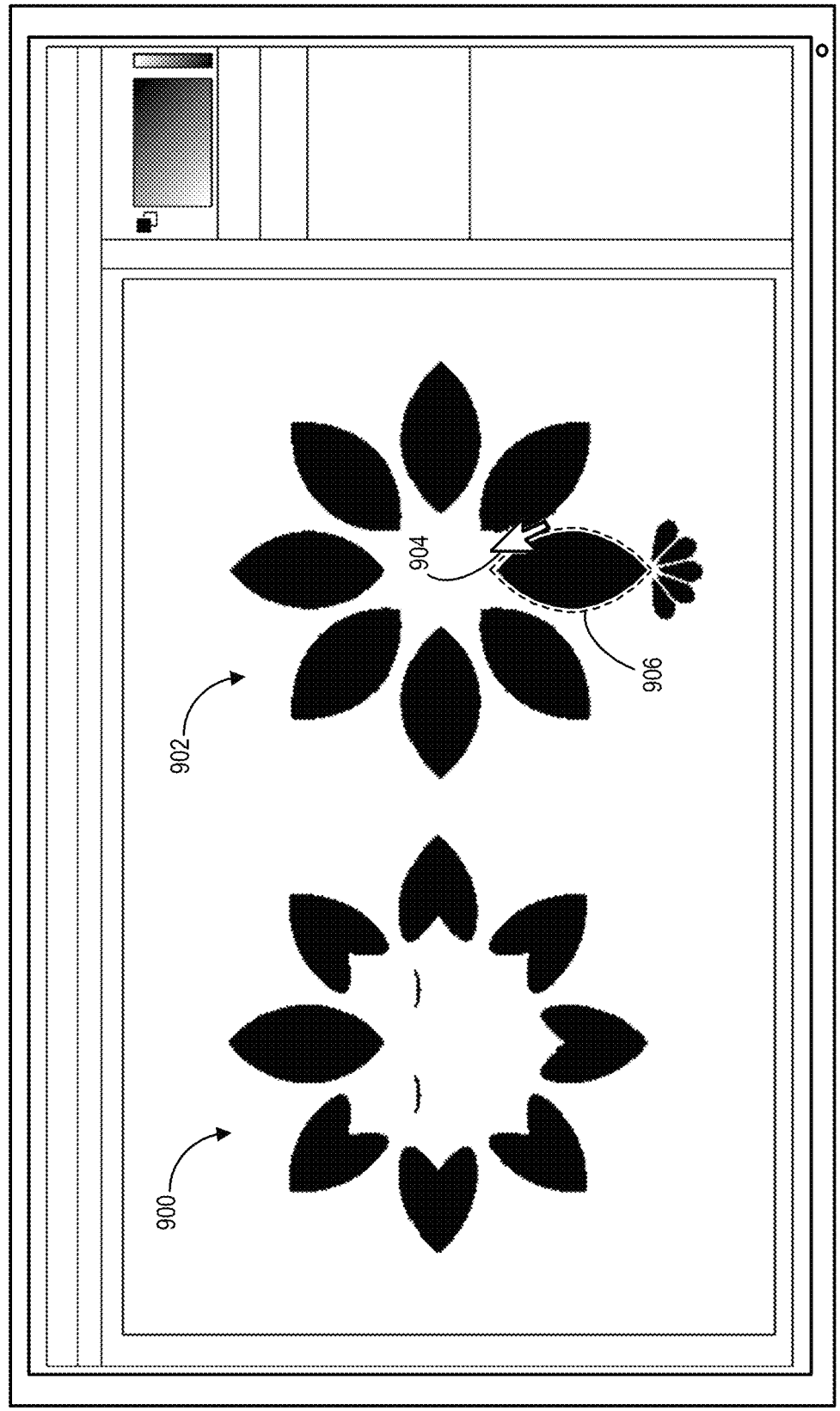
FIGS. 9A-9B illustrate graphical user interfaces for modifying a selected path geometry according to one or more similar path geometries in a digital image in accordance with one or more implementations.
Figure 9B:
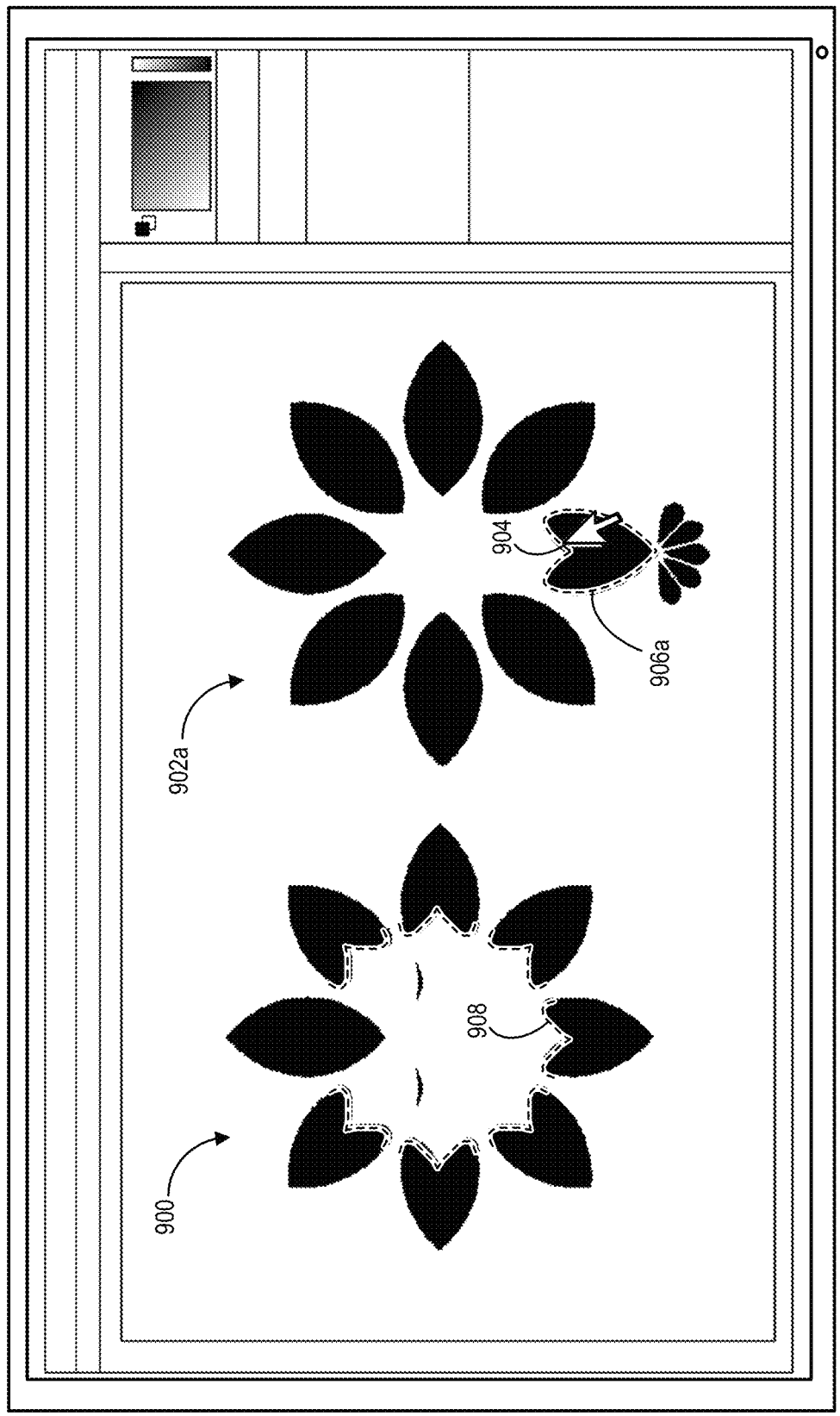

FIGS. 9A-9B illustrates graphical user interfaces of a client device displaying artworks in a digital image. For example, FIGS. 9A-9B illustrate a first artwork 900 and a second artwork 902 including a plurality of path objects, each including one or more sets of connected paths. To illustrate, FIG. 9A illustrates artworks similar to the artworks in FIG. 8B after generating the modified first artwork 800a. As shown, the path geometry snapping system 102 provides tools for modifying portions of the second artwork 902 based on path geometries in the first artwork 900. As illustrated in FIG. 9A, the path geometry snapping system 102 determines a position of a cursor 904 selecting a portion of a first path object 906 in the second artwork 902 (e.g., by selecting a connected path set or an anchor point of the connected path set).

FIG. 9B illustrates that the client device displays a modified second artwork 902a in response to modifying the second artwork 902 of FIG. 9A according to a candidate path set 908 in the first artwork 900. For example, the path geometry snapping system 102 determines a plurality of candidate path sets from a plurality of path objects of the first artwork 900. The client device displays visual indicators of the candidate path sets in the first artwork 900 by modifying a visual attribute of the candidate path sets (e.g., color or other attribute to visually distinguish the candidate path sets from other content) in the first artwork 900, including a visual attribute of the candidate path set 908. In one or more embodiments, the path geometry snapping system 102 highlights the candidate path sets in response to generating a modified path object 906a including a modified path geometry for the selected set of connected paths. As illustrated in FIGS. 8A-8B and 9A-9B, the path geometry snapping system 102 provides tools for modifying a plurality of path geometries for various connected paths sets across different path objects and/or artworks in a digital image and for providing visual indicators of similar path geometries.

Figure 10:
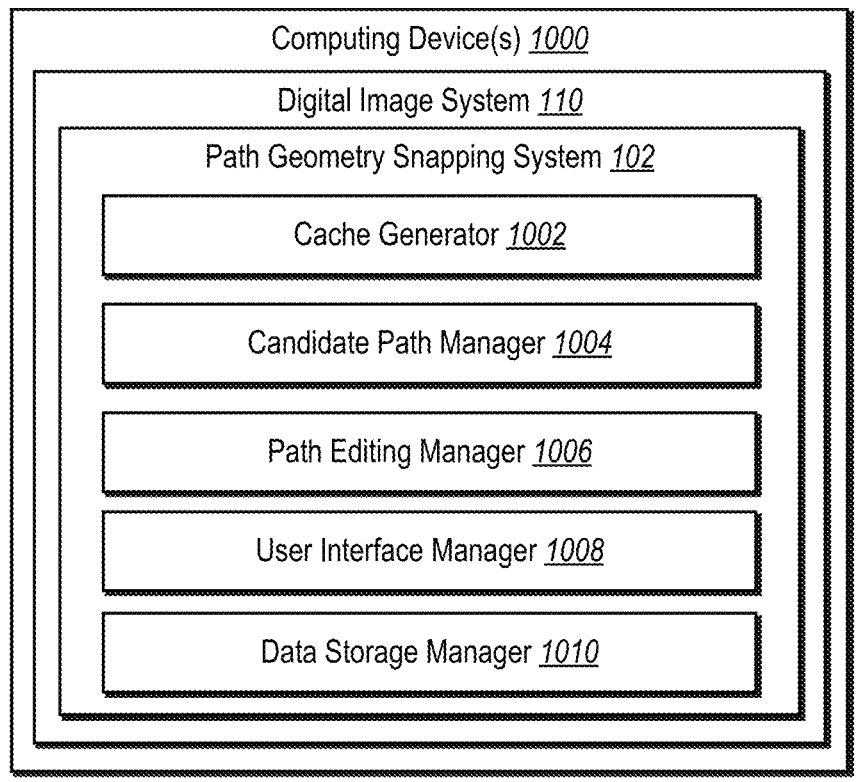
FIG. 10 illustrates a diagram of the path geometry snapping system of FIG. 1 in accordance with one or more implementations.

FIG. 10 illustrates a detailed schematic diagram of an embodiment of the path geometry snapping system 102 described above. As shown, the path geometry snapping system 102 is implemented in an digital image system 110 on computing device(s) 1000 (e.g., a client device and/or server device as described in FIG. 1, and as further described below in relation to FIG. 12). Additionally, the path geometry snapping system 102 includes, but is not limited to, a cache generator 1002, a candidate path manager 1004, a path editing manager 1006, a user interface manager 1008, and a data storage manager 1010. In one or more embodiments, the path geometry snapping system 102 is implemented on any number of computing devices. For example, path geometry snapping system can be implemented in a distributed system of server devices for digital images. The path geometry snapping system 102 can also be implemented within one or more additional systems. Alternatively, the path geometry snapping system 102 can be implemented on a single computing device such as a single client device.

In one or more embodiments, each of the components of the path geometry snapping system 102 is in communication with other components using any suitable communication technologies. Additionally, the components of the path geometry snapping system 102 are capable of being in communication with one or more other devices including other computing devices of a user, server devices (e.g., cloud storage devices), licensing servers, or other devices/systems. It will be recognized that although the components of the path geometry snapping system 102 are shown to be separate in FIG. 10, any of the subcomponents may be combined into fewer components, such as into a single component, or divided into more components as may serve a particular implementation. Furthermore, although the components of FIG. 10 are described in connection with the path geometry snapping system 102, at least some of the components for performing operations in conjunction with the path geometry snapping system 102 described herein may be implemented on other devices within the environment.

In some embodiments, the components of the path geometry snapping system 102 include software, hardware, or both. For example, the components of the path geometry snapping system 102 include one or more instructions stored on a computer-readable storage medium and executable by processors of one or more computing devices (e.g., the computing device(s) 1000). When executed by the one or more processors, the computer-executable instructions of the path geometry snapping system 102 cause the computing device(s) 1000 to perform the operations described herein. Alternatively, the components of the path geometry snapping system 102 include hardware, such as a special purpose processing device to perform a certain function or group of functions. Additionally, or alternatively, the components of the path geometry snapping system 102 include a combination of computer-executable instructions and hardware.

Furthermore, the components of the path geometry snapping system 102 performing the functions described herein with respect to the path geometry snapping system 102 may, for example, be implemented as part of a stand-alone application, as a module of an application, as a plug-in for applications, as a library function or functions that may be called by other applications, and/or as a cloud-computing model. Thus, the components of the path geometry snapping system 102 may be implemented as part of a stand-alone application on a personal computing device or a mobile device. Alternatively, or additionally, the components of the path geometry snapping system 102 may be implemented in any application that provides digital image modification, including, but not limited to ADOBE® ILLUSTRATOR® and ADOBE® CREATIVE CLOUD® software.

As illustrated, the path geometry snapping system 102 includes a cache generator 1002 to generate a path cache for a digital image. In particular, the cache generator 1002 processes a digital image to determine sets of connected paths and metadata associated with the sets of connected paths. For instance, the path geometry snapping system 102 determines control points for the sets of connected paths in the digital image and stores the control points in a data structure within the path cache.

The path geometry snapping system 102 also includes a candidate path manager 1004 to determine connected path sets having similar path geometries to a selected connected path set in a digital image. For instance, the candidate path manager 1004 accesses a path cache for the digital image to iteratively compare metadata for connected path sets in the path cache to metadata for the selected connected path set. The candidate path manager 1004 adds connected path sets to a list of candidate path sets in response to the connected path sets meeting a threshold error relative to the selected connected path set.

In one or more embodiments, the path geometry snapping system 102 includes a path editing manager 1006 to modify a path geometry of a selected connected path set of a digital image. Specifically, the path editing manager 1006 modifies the selected connected path set based on path information of a candidate path set. For example, the path editing manager 1006 modifies path information of the selected connected path set by replacing the path information with modified path information of the candidate path set. Thus, the path editing manager 1006 snaps the path geometry of the selected connected path set to a path geometry of the candidate path set.

The path geometry snapping system 102 also includes a user interface manager 1008 to provide tools and information associated with modifying a path geometry in a digital image. In particular, the user interface manager 1008 provides tools for selecting or otherwise interacting with paths in the digital image. The user interface manager 1008 also provides visual indicators of candidate path sets having similar geometries to a selected connected path set.

The path geometry snapping system 102 also includes a data storage manager 1010 (that comprises a non-transitory computer memory) that stores and maintains data associated with modifying path geometries of paths in digital images. For example, the data storage manager 1010 stores metadata associated with paths including anchor points and control points corresponding to the anchor points. The data storage manager 1010 also stores a path cache including metadata for connected path sets in a digital image.

Figure 11:
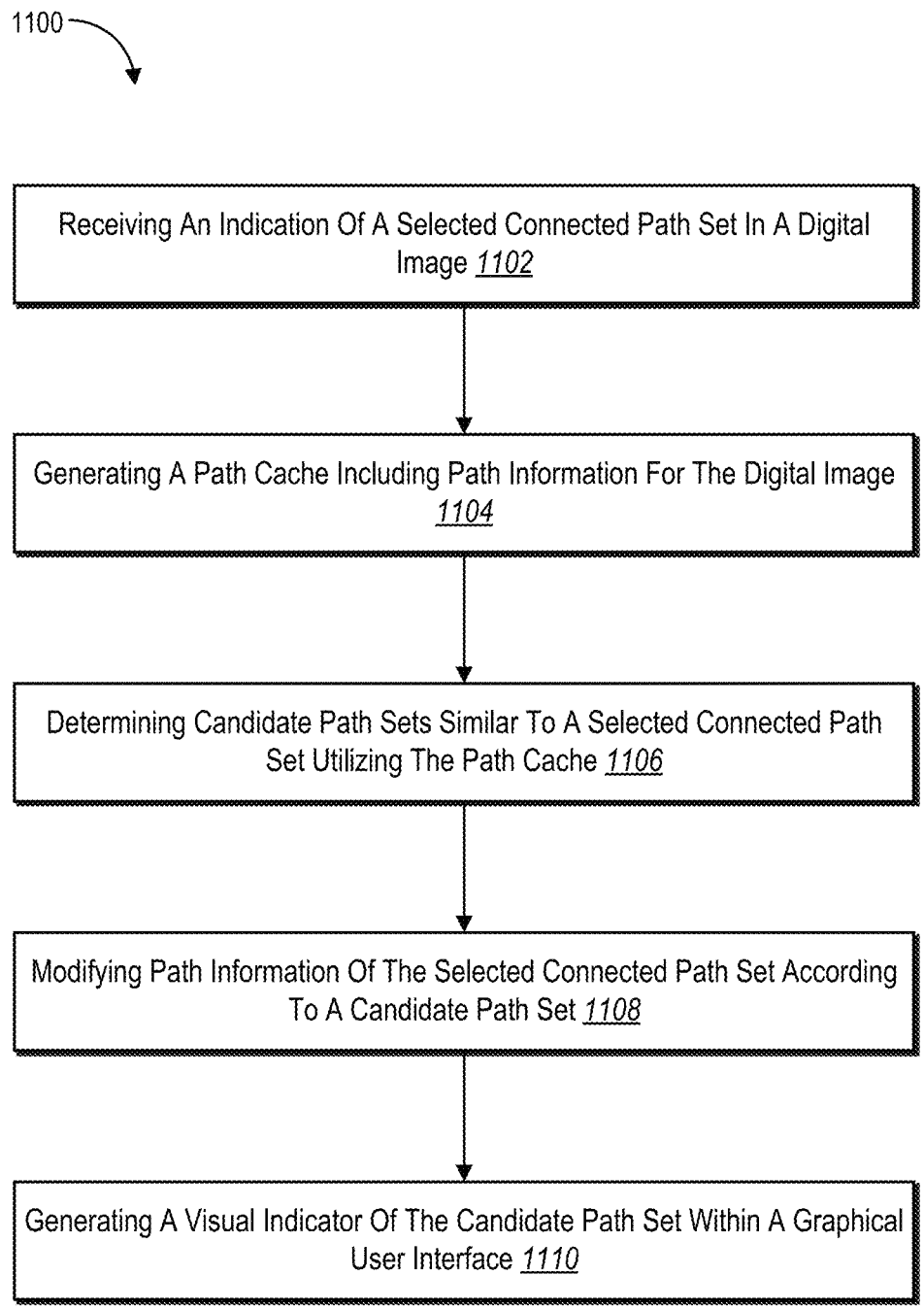
FIG. 11 illustrates a flowchart of a series of acts for modifying a path geometry in a digital image according to one or more similar path geometries in the digital image in accordance with one or more implementations.

Turning now to FIG. 11, this figure shows a flowchart of a series of acts 1100 of modifying a path geometry in a digital image according to one or more similar path geometries in the digital image. While FIG. 11 illustrates acts according to one embodiment, alternative embodiments may omit, add to, reorder, and/or modify any of the acts shown in FIG. 11. The acts of FIG. 11 are part of a method. Alternatively, a non-transitory computer readable medium comprises instructions, that when executed by one or more processors, cause the one or more processors to perform the acts of FIG. 11. In still further embodiments, a system includes a processor or server configured to perform the acts of FIG. 11.

As shown, the series of acts 1100 includes an act 1102 of receiving an indication of a selected connected path set in a digital image. an act 1104 of generating a path cache including path information for the digital image. The series of acts 1100 also includes an act 1106 of determining candidate path sets similar to a selected connected path set utilizing the path cache. Furthermore, the series of acts 1100 includes an act 1108 of modifying path information of the selected connected path set according to a candidate path set. Additionally, the series of acts 1100 includes an act 1110 of generating a visual indicator of the candidate path set within a graphical user interface.

In one or more embodiments, the series of acts 1100 includes receiving an indication of a selected connected path set comprising an anchor point in a digital image. The series of acts 1100 includes generating a path cache comprising path information for a plurality of connected path sets within the digital image. The series of acts 1100 also includes determining, from the plurality of connected path sets, one or more candidate path sets comprising path information in the path cache within a threshold error of path information of the selected connected path set. Additionally, the series of acts 1100 includes modifying, in response to movement of the anchor point in the digital image and utilizing the path cache, the path information of the selected connected path set utilizing path information of a candidate path set of the one or more candidate path sets to change a geometry of the selected connected path set according to the candidate path set. Furthermore, in some embodiments, the series of acts 1100 includes generating, for display via a graphical user interface of a client device, a visual indicator of a candidate path set of the one or more candidate path sets within the digital image utilizing path information of the candidate path set.

In some embodiments, the series of acts 1100 includes determining a connected path set comprising at least two paths connected by one or more anchor points in the digital image. The series of acts 1100 can include determining control points of a plurality of anchor points of the at least two paths connected by the one or more anchor points. The series of acts 1100 can also include inserting metadata associated with the control points of the plurality of anchor points of the at least two paths into the path cache for the connected path set.

The series of acts 1100 can include determining, from the path cache, attributes of one or more stationary anchor points of a connected path set of the plurality of connected path sets. The series of acts 1100 can also include determining that the attributes of the one or more stationary anchor points of the connected path set are within the threshold error of attributes of one or more stationary anchor points of the selected connected path set. Additionally, the series of acts 1100 can include adding the connected path set to the one or more candidate path sets.

In one or more embodiments, the series of acts 1100 includes determining positions of a plurality of stationary anchor points of the connected path set. The series of acts 1100 can include determining a subset of control points of the plurality of stationary anchor points of the connected path set.

The series of acts 1100 can also include modifying a visual attribute of the connected path set within the digital image in response to adding the connected path set to the one or more candidate path sets.

The series of acts 1100 can include determining, in response to the movement of the anchor point in the digital image, that path information of the candidate path set of the one or more candidate path sets is within the threshold error or an additional threshold error of the path information of the selected connected path set comprising the anchor point. The series of acts 1100 can also include modifying the path information of the selected connected path set according to the path information of the candidate path set and a transformation matrix. For example, the series of acts 1100 includes snapping a shape of the selected connected path set to a shape of the candidate path set based on the path information of the candidate path set in response to the path information of the candidate path set being within the threshold error or the additional threshold error of the path information of the selected connected path set.

The series of acts 1100 can include determining a first matrix comprising control points of anchor points of the candidate path set. The series of acts 1100 can also include determining a second matrix comprising control points of anchor points of the selected connected path set. Additionally, the series of acts 1100 can include comparing the first matrix to the second matrix via a matrix transformation to determine that the path information of the candidate path set is within the threshold error or the additional threshold error of the path information of the selected connected path set.

The series of acts 1100 can include iteratively comparing the path information of the selected connected path set to the path information of the plurality of connected path sets within the path cache while the anchor point of the selected connected path set is selected.

In one or more embodiments, the series of acts 1100 includes determining a connected path set comprising a first path and a second path of the digital image connected by a first anchor point, the connected path set also comprising a second anchor point and a third anchor point forming end points of the connected path set. The series of acts 1100 can include determining control points of the first anchor point, the second anchor point, and the third anchor point. The series of acts 1100 can include inserting, into the path cache for the connected path set, metadata associated with the control points of the first anchor point, the second anchor point, and the third anchor point of the connected path set.

The series of acts 1100 can also include determining a plurality of control points for the first anchor point. The series of acts 1100 can also include determining a first inner control point corresponding to the second anchor point at a first end point of the connected path set. The series of acts 1100 can also include determining a second inner control point corresponding to the third anchor point at a second end point of the connected path set.

Additionally, the series of acts 1100 can include determining, from the path cache in response to a selection of the anchor point of the selected connected path set, control points of a subset of anchor points of a connected path set of the plurality of connected path sets. The series of acts 1100 can include determining that the control points of the subset of anchor points of the connected path set are within the threshold error of control points of a subset of anchor points of the selected connected path set. The series of acts 1100 can further include adding the connected path set to the one or more candidate path sets.

The series of acts 1100 can include determining a first matrix comprising the control points of the subset of anchor points of the connected path set. The series of acts 1100 can include determining a second matrix comprising the control points of the subset of anchor points of the connected path set. Additionally, the series of acts 1100 can include determining that the first matrix is within the threshold error of the second matrix via a matrix transformation.

In one or more embodiments, the series of acts 1100 includes generating the visual indicator of the candidate path set by highlighting a connected path set corresponding the candidate path set within the digital image in response to adding the connected path set to the one or more candidate path sets.

The series of acts 1100 can include determining that path information of the candidate path set is within an additional threshold error of the path information of the selected connected path set in response to movement of the anchor point of the selected connected path set. The series of acts 1100 can include modifying the path information of the selected connected path set according to the path information of the candidate path set and a transformation matrix.

Additionally, the series of acts 1100 can include determining that path information of an additional candidate path set of the one or more candidate path sets is within the additional threshold error of the path information of the selected connected path set. The series of acts 1100 can include determining that the path information of the candidate path set has a lower error relative to the path information of the selected connected path set than the path information of the additional candidate path set.

The series of acts 1100 can include determining, by iterating through the path cache while the anchor point of the selected connected path set is selected, attributes of stationary anchor points of a connected path set of the plurality of connected path sets. The series of acts 1100 can further include adding the connected path set to the one or more candidate path sets in response to determining that the attributes of the stationary anchor points of the connected path set are within the threshold error of attributes of stationary anchor points of the selected connected path set.

The series of acts 1100 can further include determining, in response to movement of the anchor point, that path information of a candidate path set of the one or more candidate path sets is within an additional threshold error of the path information of the selected connected path set comprising the anchor point. The series of acts 1100 can also include modifying the path information of the selected connected path set by generating updated path information for the selected connected path set according to the path information of the candidate path set and a transformation matrix.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
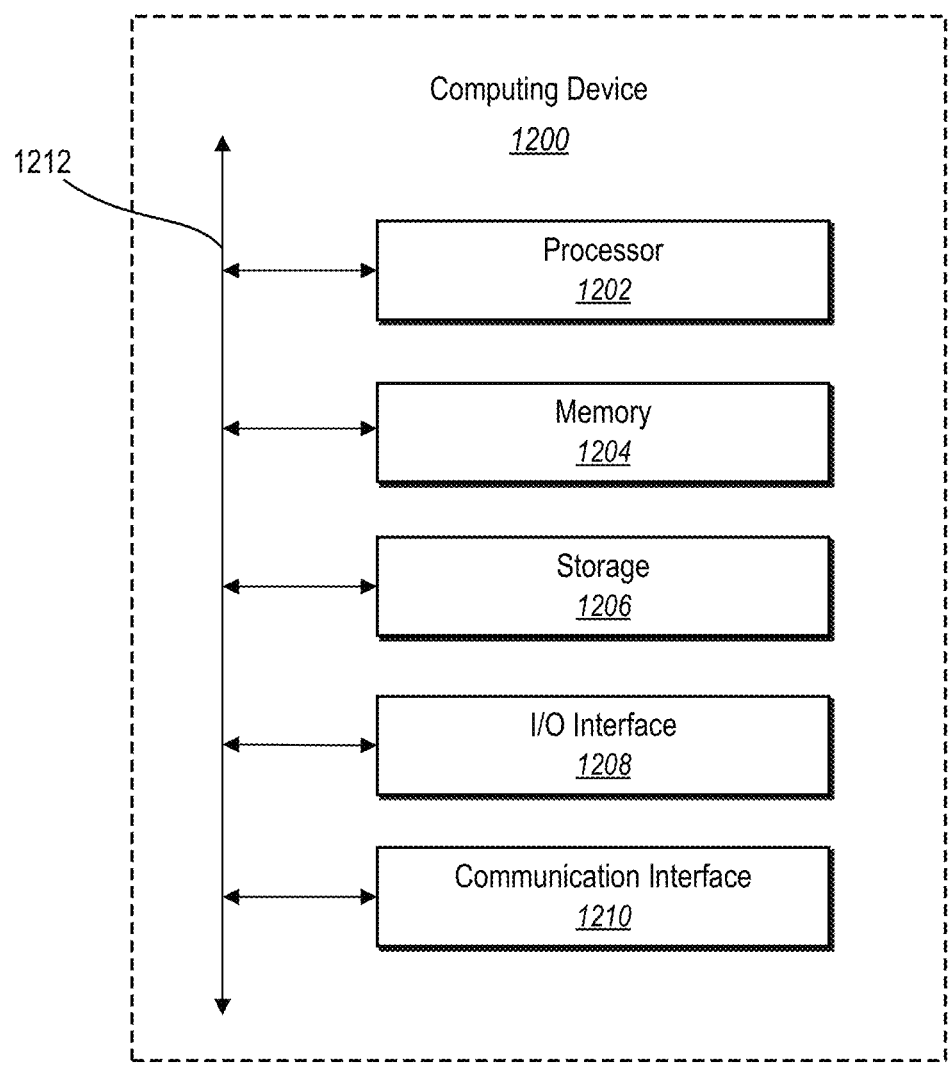
FIG. 12 illustrates a block diagram of an exemplary computing device in accordance with one or more embodiments.

FIG. 12 illustrates a block diagram of exemplary computing device 1200 that may be configured to perform one or more of the processes described above. One will appreciate that one or more computing devices such as the computing device 1200 may implement the system(s) of FIG. 1. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for dynamically modifying workflows, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions for performing the methods described herein.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example, and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
receiving an indication of a selected connected path set comprising an anchor point in a digital image;
generating a path cache comprising path information for a plurality of connected path sets within the digital image;
determining, from the plurality of connected path sets, one or more candidate path sets comprising path information in the path cache within a threshold error of path information of the selected connected path set; and
modifying, in response to movement of the anchor point in the digital image and utilizing the path cache, the path information of the selected connected path set utilizing path information of a candidate path set of the one or more candidate path sets to change a geometry of the selected connected path set according to the candidate path set.

2. The method of claim 1, wherein generating the path cache comprises:
determining a connected path set comprising at least two paths connected by one or more anchor points in the digital image;
determining control points of a plurality of anchor points of the at least two paths connected by the one or more anchor points; and
inserting metadata associated with the control points of the plurality of anchor points of the at least two paths into the path cache for the connected path set.

3. The method of claim 1, wherein determining the one or more candidate path sets comprises:
determining, from the path cache, attributes of one or more stationary anchor points of a connected path set of the plurality of connected path sets;
determining that the attributes of the one or more stationary anchor points of the connected path set are within the threshold error of attributes of one or more stationary anchor points of the selected connected path set; and
adding the connected path set to the one or more candidate path sets.

4. The method of claim 3, wherein determining the attributes of the one or more stationary anchor points of the connected path set comprises:
determining positions of a plurality of stationary anchor points of the connected path set; and
determining a subset of control points of the plurality of stationary anchor points of the connected path set.

5. The method of claim 3, further comprising modifying a visual attribute of the connected path set within the digital image in response to adding the connected path set to the one or more candidate path sets.

6. The method of claim 1, wherein modifying the path information of the selected connected path set comprises:
determining, in response to the movement of the anchor point in the digital image, that path information of the candidate path set of the one or more candidate path sets is within an additional threshold error of the path information of the selected connected path set comprising the anchor point; and
modifying the path information of the selected connected path set according to the path information of the candidate path set and a transformation matrix.

7. The method of claim 6, wherein determining that the path information in the path cache for a candidate path set of the one or more candidate path sets is within an additional threshold error of the path information of the selected connected path set comprises:
determining a first matrix comprising control points of anchor points of the candidate path set;
determining a second matrix comprising control points of anchor points of the selected connected path set; and
comparing the first matrix to the second matrix via a matrix transformation to determine that the path information of the candidate path set is within the additional threshold error of the path information of the selected connected path set.

8. The method of claim 6, wherein modifying the path information of the selected connected path set comprises snapping a shape of the selected connected path set to a shape of the candidate path set based on the path information of the candidate path set in response to the path information of the candidate path set being within the additional threshold error of the path information of the selected connected path set.

9. The method of claim 1, wherein determining the one or more candidate path sets comprises iteratively comparing the path information of the selected connected path set to the path information of the plurality of connected path sets within the path cache while the anchor point of the selected connected path set is selected.

10. A system comprising:
a memory component; and
one or more processing devices coupled to the memory component, the one or more processing devices to perform operations comprising:
receiving an indication of a selected connected path set comprising an anchor point in a digital image;
generating a path cache comprising path information for a plurality of connected path sets within the digital image;
determining, from the plurality of connected path sets, one or more candidate path sets comprising path information in the path cache within a threshold error of path information of the selected connected path set; and
generating, for display via a graphical user interface of a client device, a visual indicator of a candidate path set of the one or more candidate path sets within the digital image utilizing path information of the candidate path set.

11. The system of claim 10, wherein generating the path cache comprises:
determining a connected path set comprising a first path and a second path of the digital image connected by a first anchor point, the connected path set also comprising a second anchor point and a third anchor point forming end points of the connected path set;
determining control points of the first anchor point, the second anchor point, and the third anchor point; and
inserting, into the path cache for the connected path set, metadata associated with the control points of the first anchor point, the second anchor point, and the third anchor point of the connected path set.

12. The system of claim 11, wherein determining the control points of the first anchor point, the second anchor point, and the third anchor point comprises:
  determining a plurality of control points for the first anchor point;
  determining a first inner control point corresponding to the second anchor point at a first end point of the connected path set; and
  determining a second inner control point corresponding to the third anchor point at a second end point of the connected path set.

13. The system of claim 10, wherein determining the one or more candidate path sets comprises:
  determining, from the path cache in response to a selection of the anchor point of the selected connected path set, control points of a subset of anchor points of a connected path set of the plurality of connected path sets;
  determining that the control points of the subset of anchor points of the connected path set are within the threshold error of control points of a subset of anchor points of the selected connected path set; and
  adding the connected path set to the one or more candidate path sets.

14. The system of claim 13, wherein determining that the control points of the subset of anchor points of the connected path set are within the threshold error of the control points of the subset of anchor points of the selected connected path set comprises:
  determining a first matrix comprising the control points of the subset of anchor points of the connected path set;
  determining a second matrix comprising the control points of the subset of anchor points of the connected path set; and
  determining that the first matrix is within the threshold error of the second matrix via a matrix transformation.

15. The system of claim 10, wherein generating the visual indicator of the candidate path set comprises highlighting a connected path set corresponding the candidate path set within the digital image in response to adding the connected path set to the one or more candidate path sets.

16. The system of claim 10, wherein the operations further comprise:
  determining that path information of the candidate path set is within the threshold error or an additional threshold error of the path information of the selected connected path set in response to movement of the anchor point of the selected connected path set; and
  modifying the path information of the selected connected path set according to the path information of the candidate path set and a transformation matrix.

17. The system of claim 16, wherein modifying the path information of the selected connected path set comprises:
  determining that path information of an additional candidate path set of the one or more candidate path sets is within the threshold error or the additional threshold error of the path information of the selected connected path set; and
  determining that the path information of the candidate path set has a lower error relative to the path information of the selected connected path set than the path information of the additional candidate path set.

18. A non-transitory computer-readable medium storing executable instructions which, when executed by at least one processing device, cause the at least one processing device to perform operations comprising:
  receiving an indication of a selected connected path set comprising an anchor point in a digital image;
  generating a path cache comprising path information for a plurality of connected path sets within the digital image;
  determining, from the plurality of connected path sets, one or more candidate path sets comprising path information in the path cache within a threshold error of path information of the selected connected path set; and
  modifying, in response to movement of the anchor point in the digital image and utilizing the path cache, the path information of the selected connected path set utilizing path information of a candidate path set of the one or more candidate path sets to change a geometry of the selected connected path set according to the candidate path set.

19. The non-transitory computer-readable medium of claim 18, wherein determining the one or more candidate path sets comprises:
  determining, by iterating through the path cache while the anchor point of the selected connected path set is selected, attributes of stationary anchor points of a connected path set of the plurality of connected path sets; and
  adding the connected path set to the one or more candidate path sets in response to determining that the attributes of the stationary anchor points of the connected path set are within the threshold error of attributes of stationary anchor points of the selected connected path set.

20. The non-transitory computer-readable medium of claim 18, wherein modifying the path information of the selected connected path set comprises:
  determining, in response to movement of the anchor point, that path information of a candidate path set of the one or more candidate path sets is within an additional threshold error of the path information of the selected connected path set comprising the anchor point; and
  modifying the path information of the selected connected path set by generating updated path information for the selected connected path set according to the path information of the candidate path set and a transformation matrix.

* * * * *